(12) United States Patent  
Kurigata

(10) Patent No.: US 8,842,332 B2  
(45) Date of Patent: Sep. 23, 2014

(54) IMAGE DEFORMATION PROCESSING DEVICE AND IMAGE DEFORMATION PROCESSING METHOD

(71) Applicant: Konica Minolta, Inc., Tokyo (JP)

(72) Inventor: Yuhei Kurigata, Hino (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 14/148,432

(22) Filed: Jan. 6, 2014

(65) Prior Publication Data

US 2014/0192370 A1 Jul. 10, 2014

(30) Foreign Application Priority Data

Jan. 10, 2013 (JP) .................................. 2013-002291

(51) Int. Cl.
*G06F 15/00* (2006.01)
(52) U.S. Cl.
USPC ............................................................. 358/1.8
(58) Field of Classification Search
USPC .............................................................. 358/1.8
See application file for complete search history.

(56) References Cited

U.S. PATENT DOCUMENTS 6,035,075 A * 3/2000 Inoue et al. ................... 382/282

FOREIGN PATENT DOCUMENTS

JP 2006-270149 A 10/2006

* cited by examiner

*Primary Examiner* — Saeid Ebrahimi Dehkordy
(74) *Attorney, Agent, or Firm* — Holtz Holtz Goodman & Chick PC

(57) ABSTRACT

Disclosed is an image deformation processing device including: a shift amount calculating unit configured to calculate the difference between the coordinate of the input image which is mapped to the position of the specified pixel by the deformation process and the coordinate of the specified pixel as a shift amount, for each specified pixel in the output image; and an output unit configured to obtain the threshold corresponding to the coordinate of the specified pixel in the second direction from the dispersion threshold table, to calculate a pixel shift amount by comparing the obtained threshold with a decimal component of the shift amount for the specified pixel and by rounding the decimal component of the shift amount, and to output the pixel in the input image, which has a coordinate shifted from the coordinate of the specified pixel by the pixel shift amount, as the specified pixel.

18 Claims, 26 Drawing Sheets

ENLARGEMENT PROCESS
(VARIABLE MAGNIFICATION RATIO:1.2)

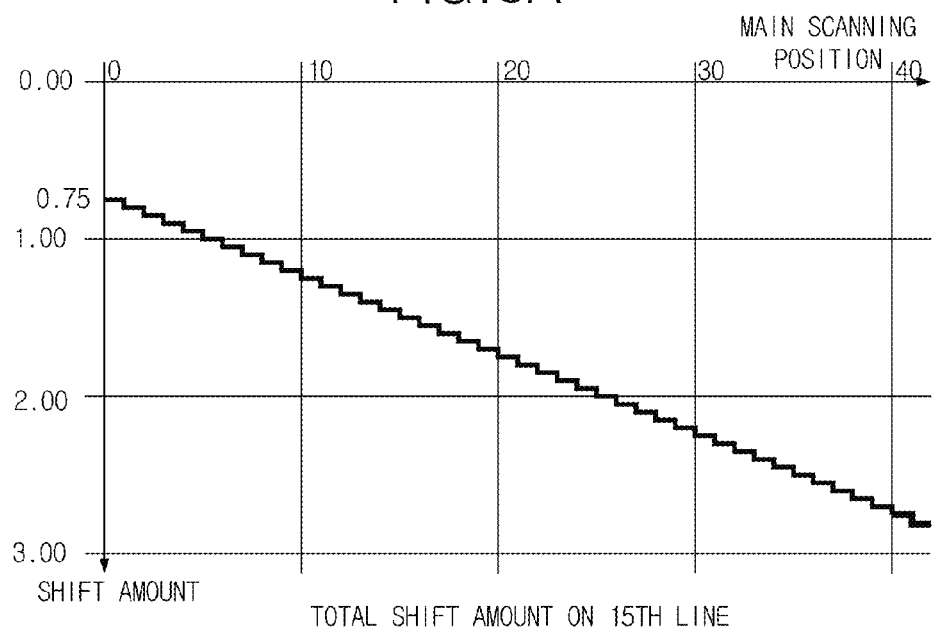
FIG.5A — TOTAL SHIFT AMOUNT ON 15TH LINE
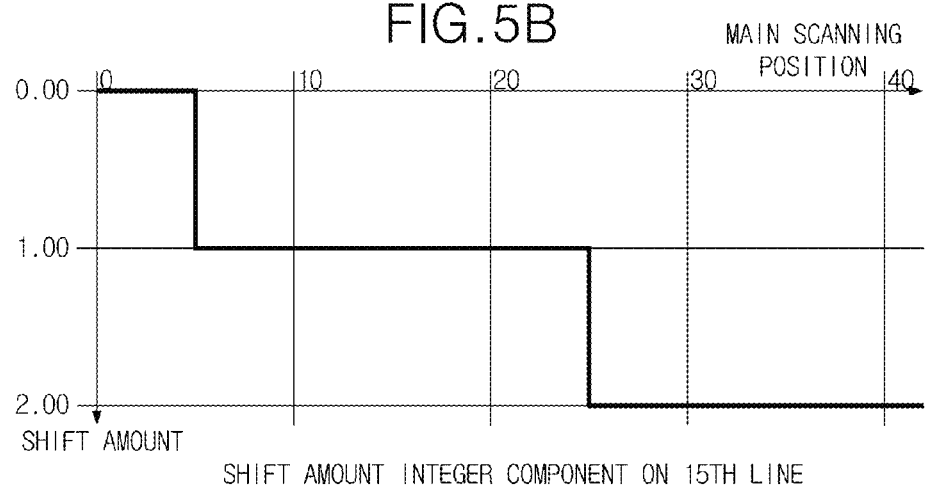
FIG.5B — SHIFT AMOUNT INTEGER COMPONENT ON 15TH LINE
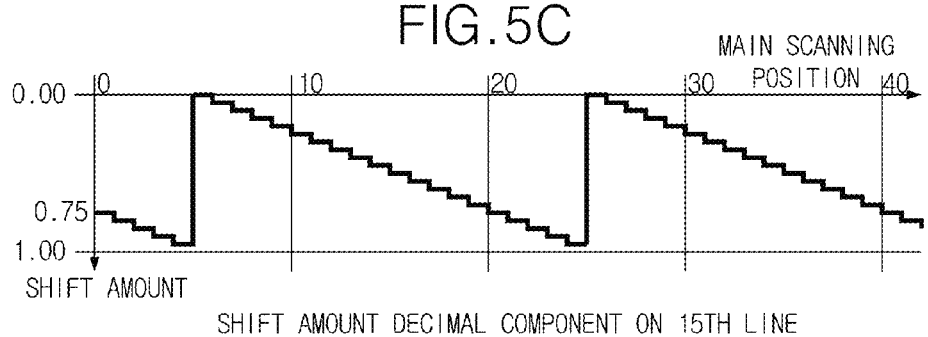
FIG.5C — SHIFT AMOUNT DECIMAL COMPONENT ON 15TH LINE

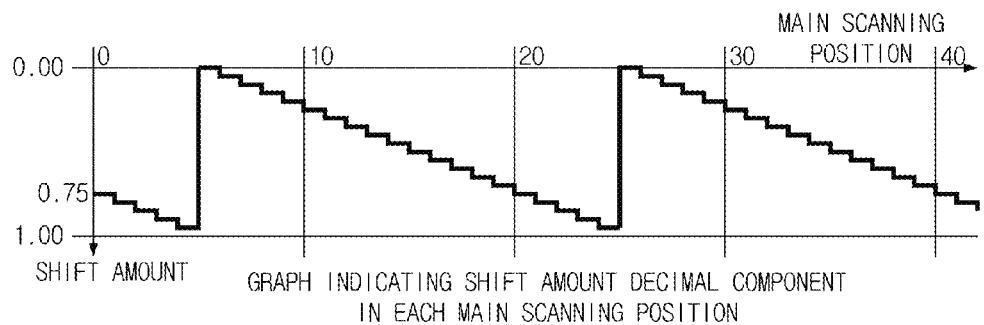
FIG.7A GRAPH INDICATING SHIFT AMOUNT DECIMAL COMPONENT IN EACH MAIN SCANNING POSITION
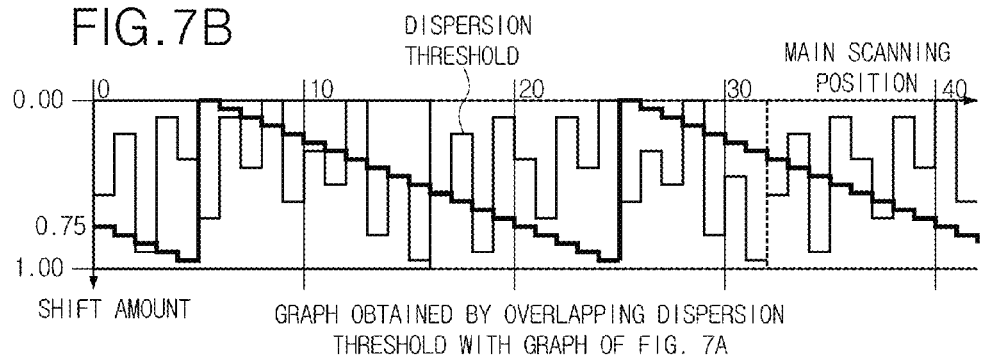
FIG.7B GRAPH OBTAINED BY OVERLAPPING DISPERSION THRESHOLD WITH GRAPH OF FIG. 7A
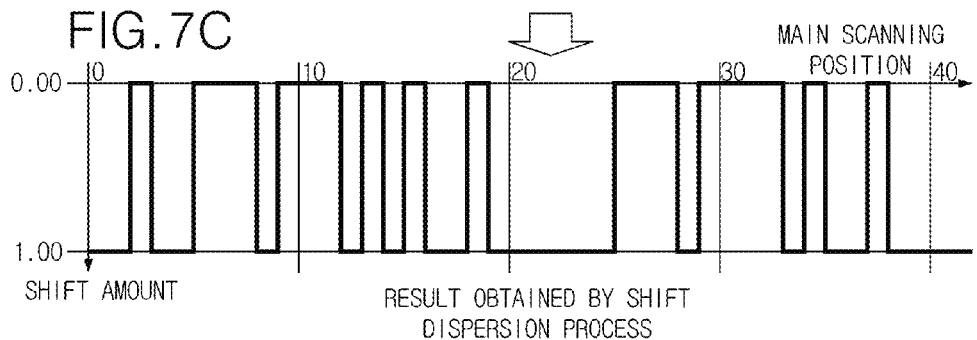
FIG.7C RESULT OBTAINED BY SHIFT DISPERSION PROCESS
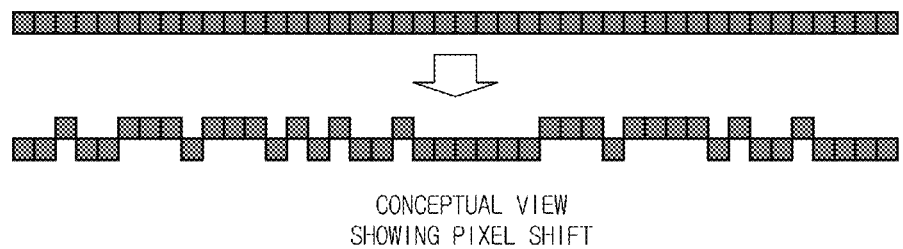
FIG.7D CONCEPTUAL VIEW SHOWING PIXEL SHIFT

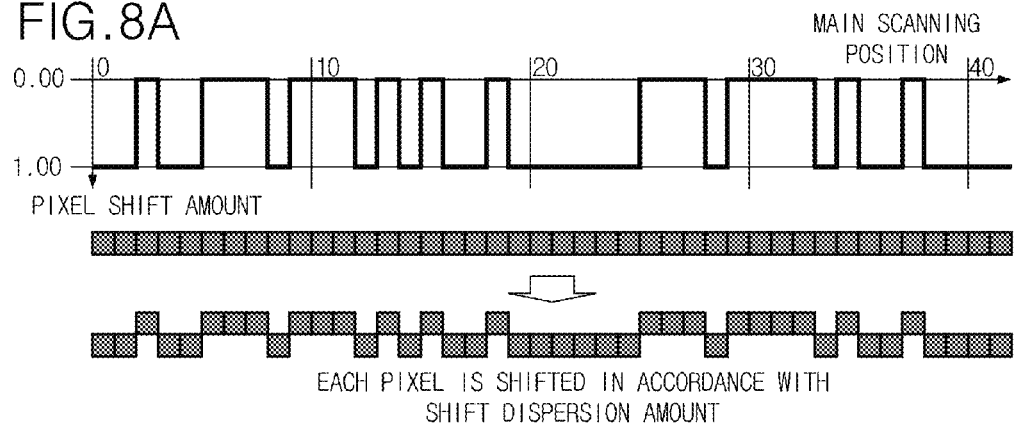
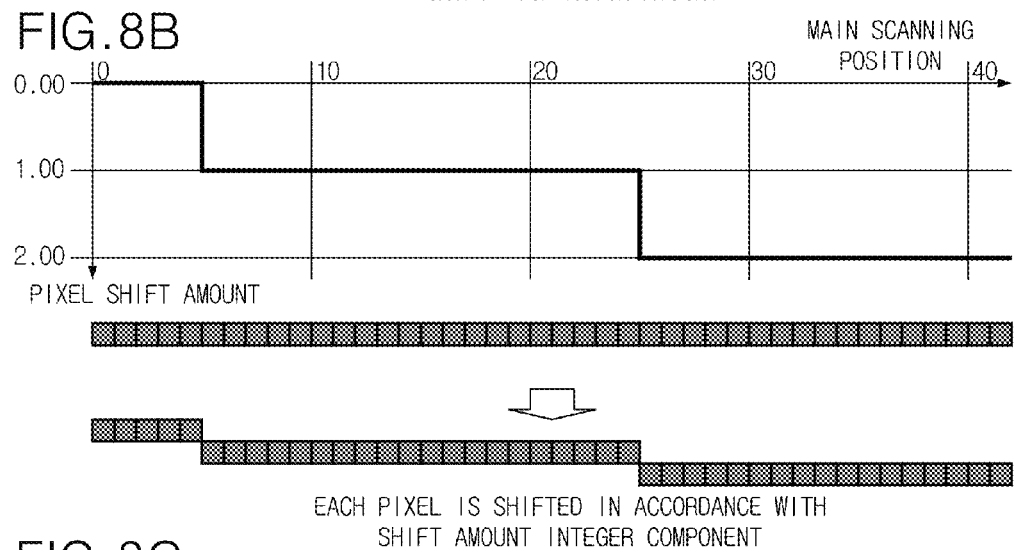
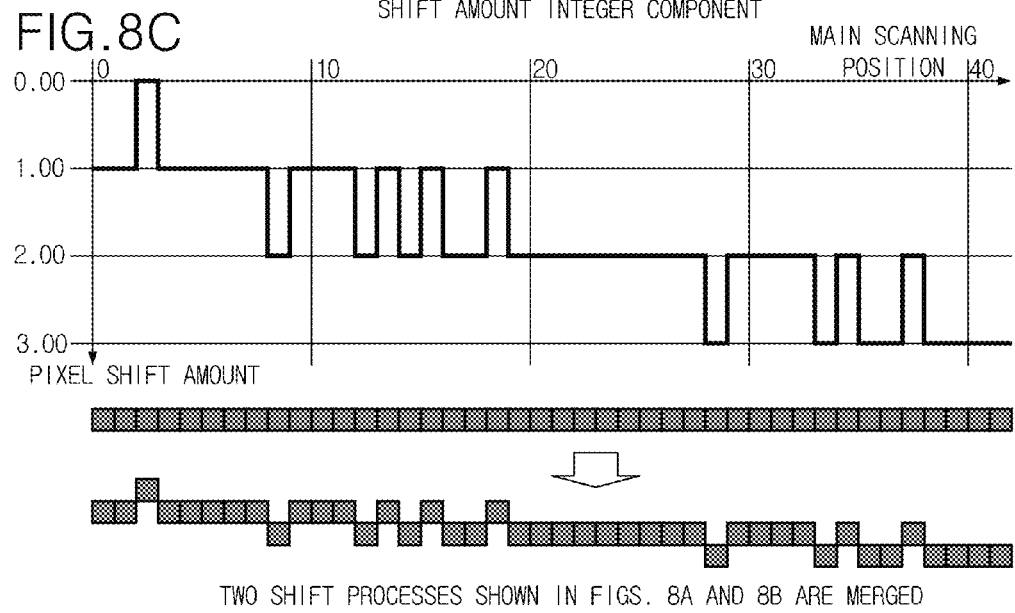

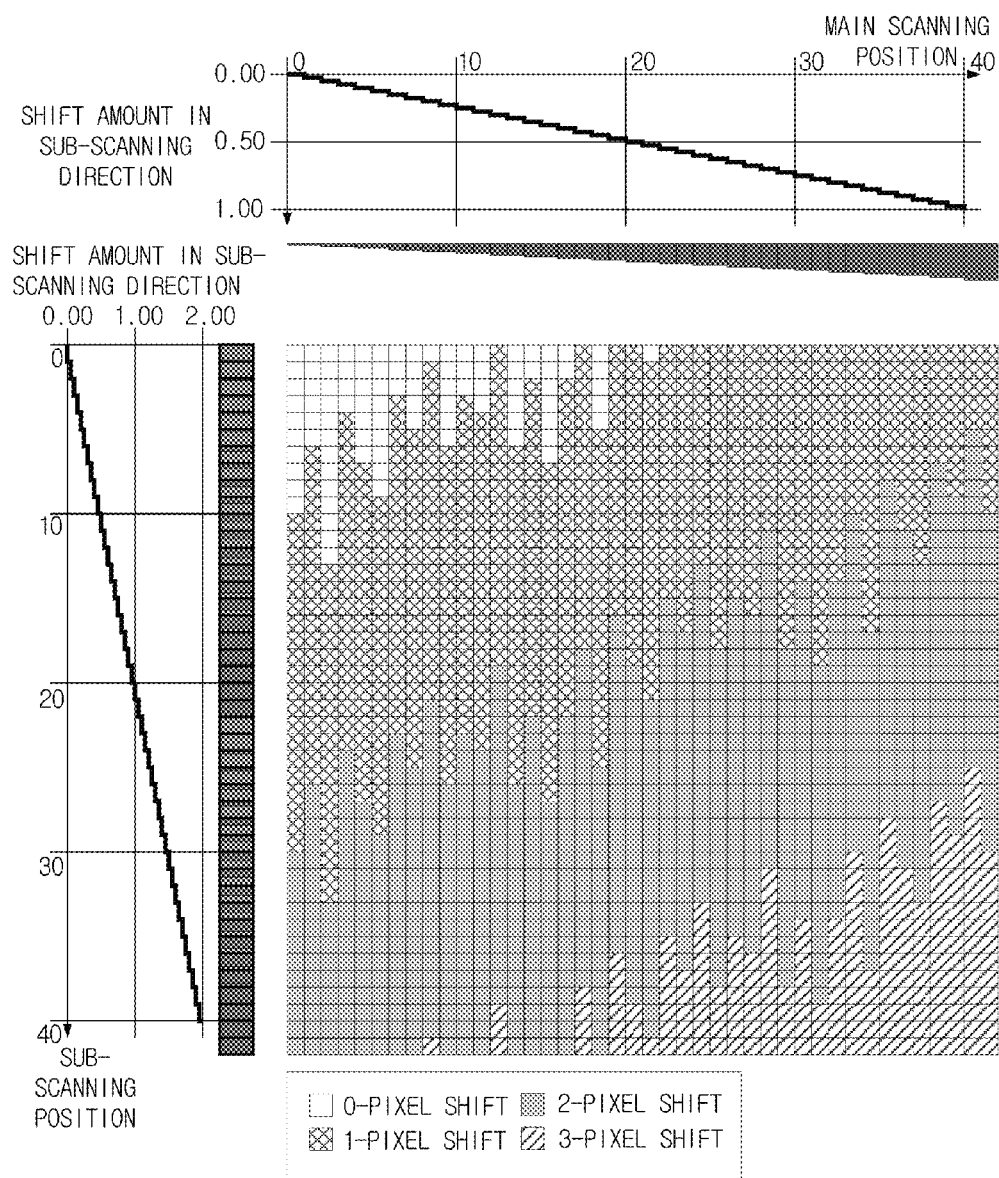

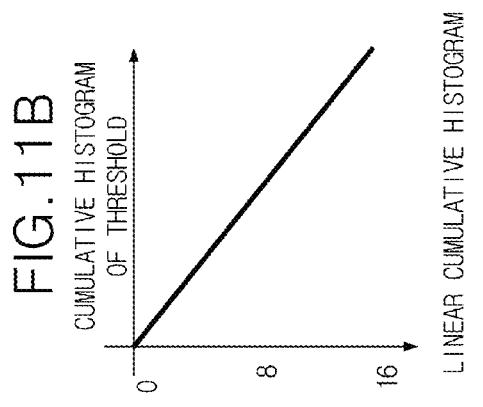
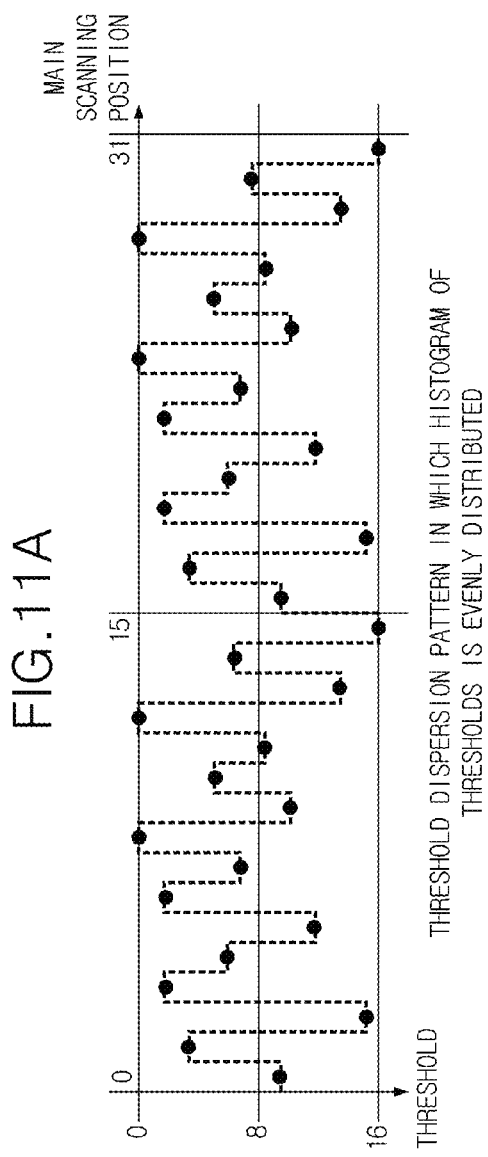
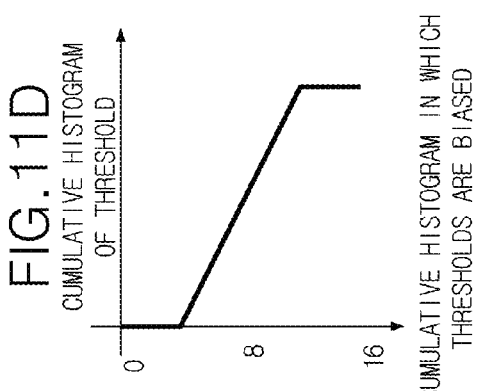
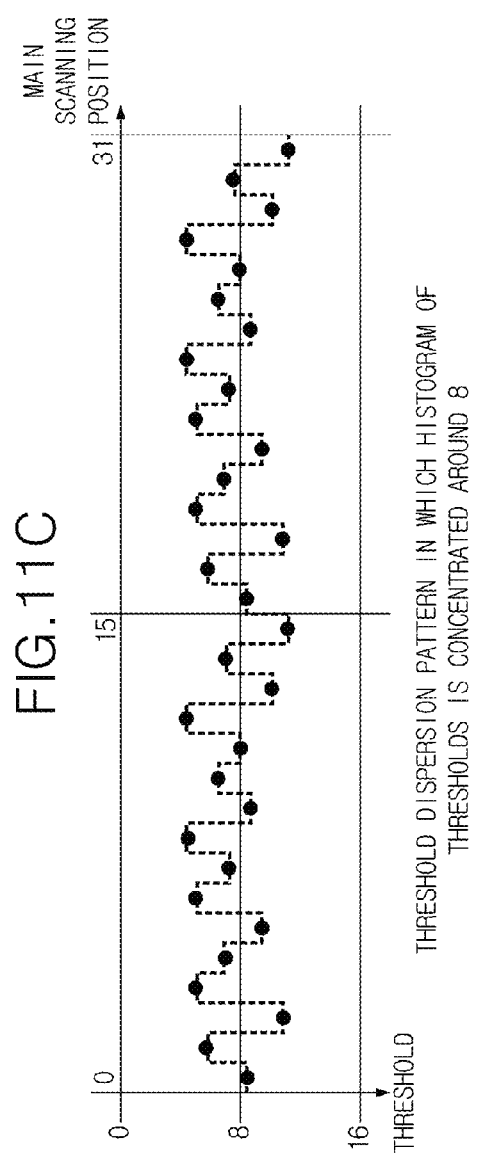

IMAGE FOR WHICH POSITION (INCLINATION) CORRECTION
HAS NOT BEEN CARRIED OUT

IMAGE OBTAINED BY CARRYING OUT CORRECTION (IN CASE THAT
THRESHOLDS ARE EVENLY DISTRIBUTED)

IMAGE OBTAINED BY CARRYING OUT CORRECTION (IN CASE THAT
THRESHOLDS ARE BIASED TO SPECIFIC VALUE)

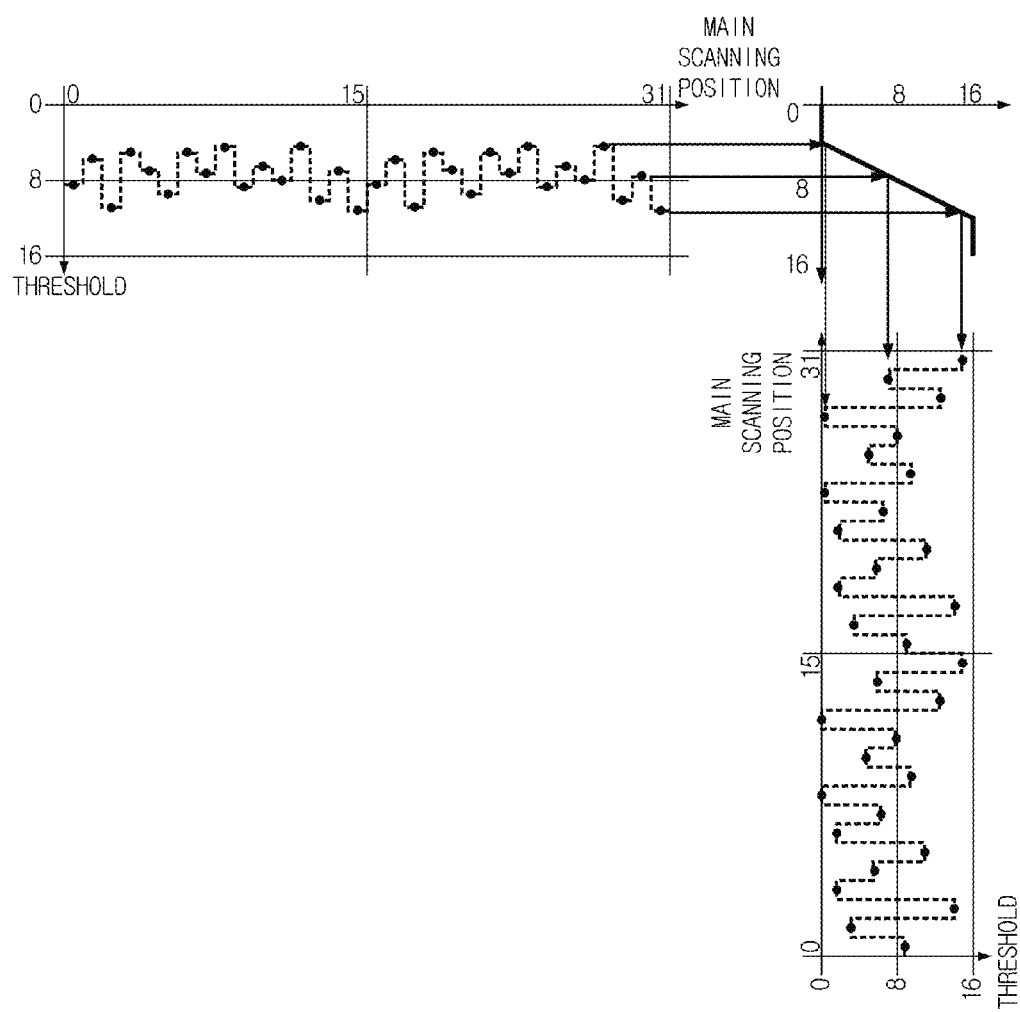

FIG.14A

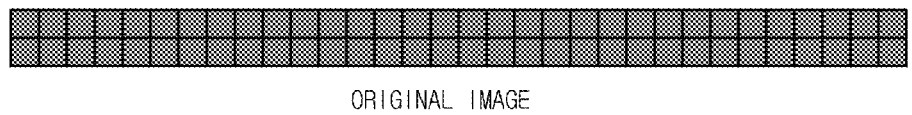

ORIGINAL IMAGE

FIG.14B

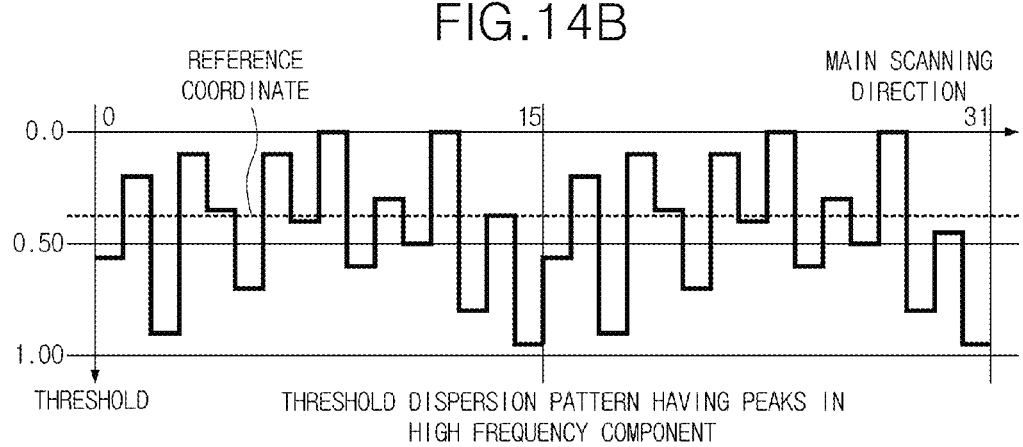

THRESHOLD DISPERSION PATTERN HAVING PEAKS IN
HIGH FREQUENCY COMPONENT

FIG.14C

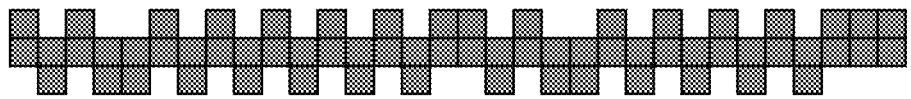

RESULT OBTAINED BY PROCESS USING THRESHOLD DISPERSION
PATTERN HAVING PEAKS IN HIGH FREQUENCY COMPONENT
(SHIFT PROCESS WHICH IS ACCOMPANIED BY ENLARGEMENT IN
VERTICAL DIRECTION AND IN WHICH EACH PIXEL IS
UNIFORMLY SHIFTED IN HORIZONTAL DIRECTION)

FIG.14D

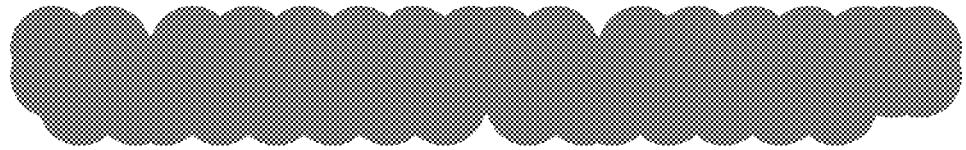

PROCESS RESULT (VISUAL IMAGE)

ORIGINAL IMAGE

LUT PATTERN HAVING NO HIGH FREQUENCY
COMPONENT

RESULT OBTAINED BY PROCESS USING LUT PATTERN HAVING
NO HIGH FREQUENCY COMPONENT
(SHIFT PROCESS WHICH IS ACCOMPANIED BY ENLARGEMENT
IN VERTICAL DIRECTION AND IN WHICH EACH PIXEL IS
UNIFORMLY SHIFTED IN HORIZONTAL DIRECTION)

PROCESS RESULT (VISUAL IMAGE)

SPECTRUM HAVING PEAK IN HIGH FREQUENCY COMPONENT

SPECTRUM HAVING PEAK IN FREQUENCY COMPONENT
EXCEPT HIGH FREQUENCY COMPONENT

LUT PATTERN HAVING PEAKS IN HIGH FREQUENCY COMPONENT

PIXEL INSERTION/DELETION POSITIONS OBTAINED BY
REFERRING LUT PATTERN SHOWN IN FIG. 17A

- PIXEL INSERTION/DELETION POSITION
- PIXEL SHIFTED DOWNWARDLY BY ONE PIXEL ACCORDING TO PIXEL INSERTION

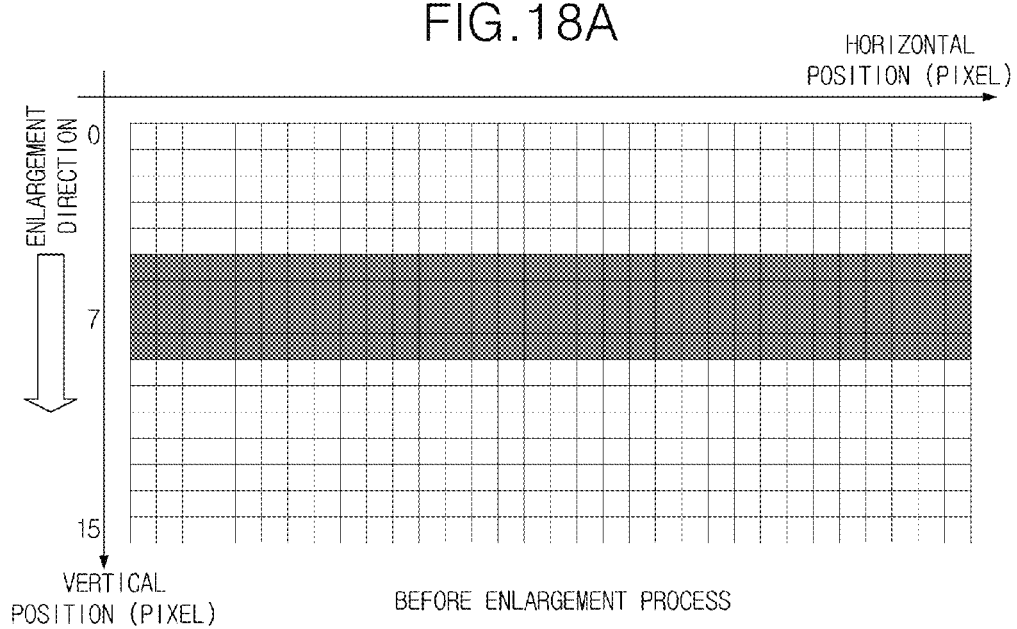
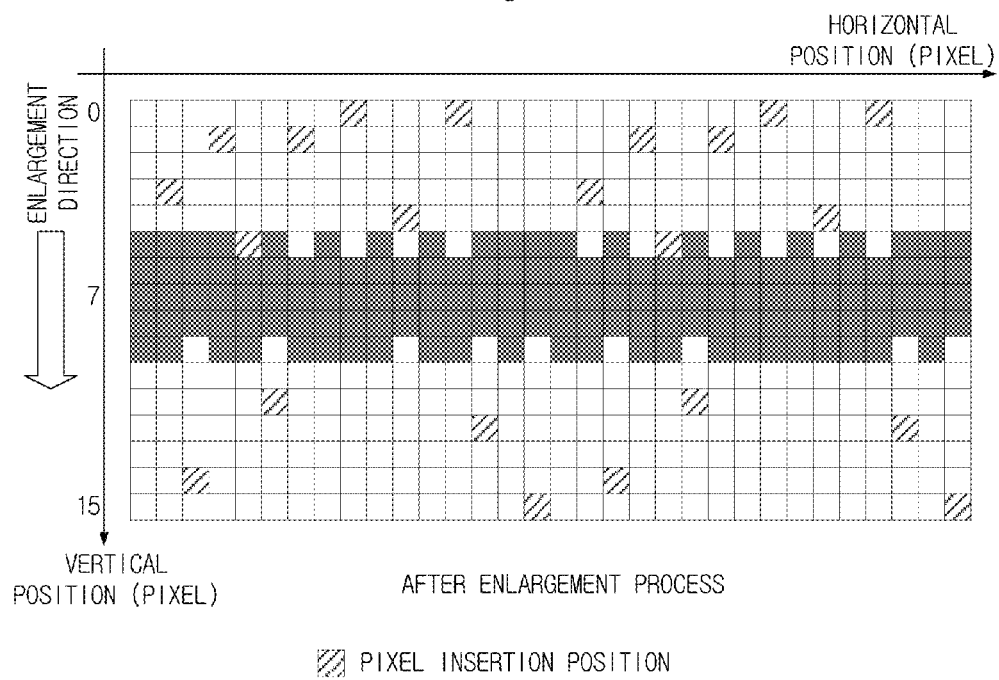

LUT FOR DISPERSING PROCESS

LUT FOR SIMPLE PROCESS

FIG.22A
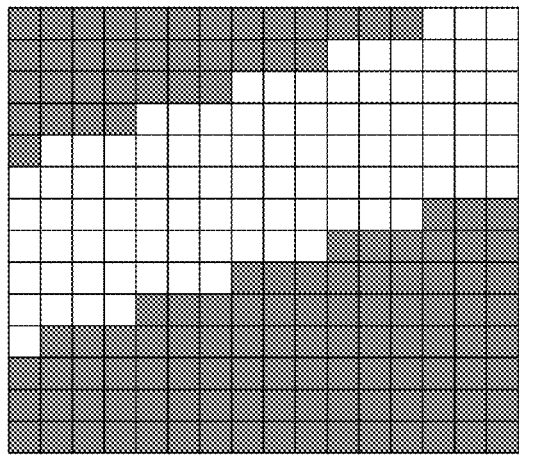
JUDGEMENT INFORMATION (0: SIMPLE PROCESS, 1: DISPERSING PROCESS)
FIG.22B
INPUT IMAGE
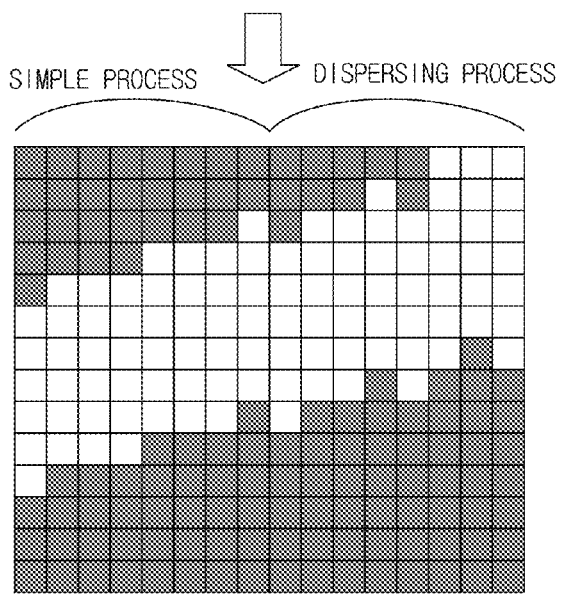
SIMPLE PROCESS    DISPERSING PROCESS
FIG.22C
OUTPUT IMAGE

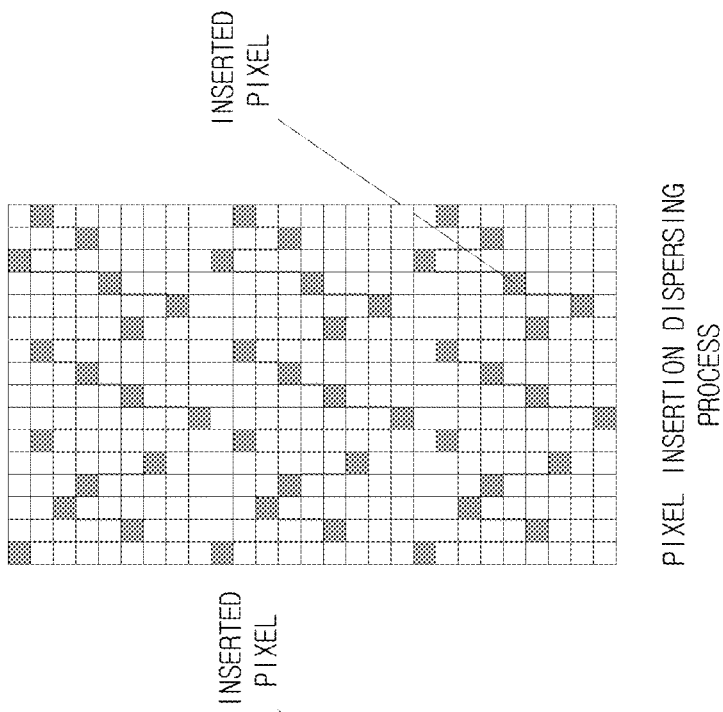
FIG.23C PIXEL INSERTION DISPERSING PROCESS
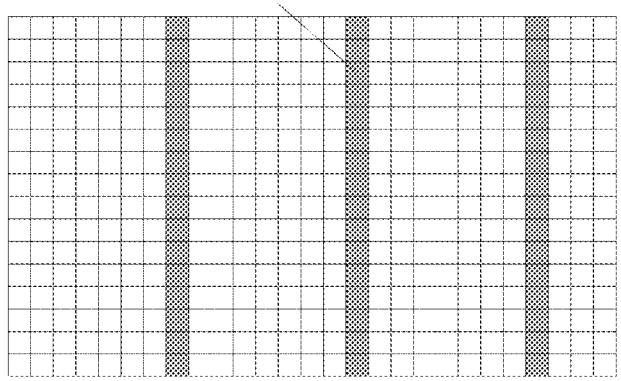
FIG.23B PIXEL INSERTION PROCESS (SIMPLE)
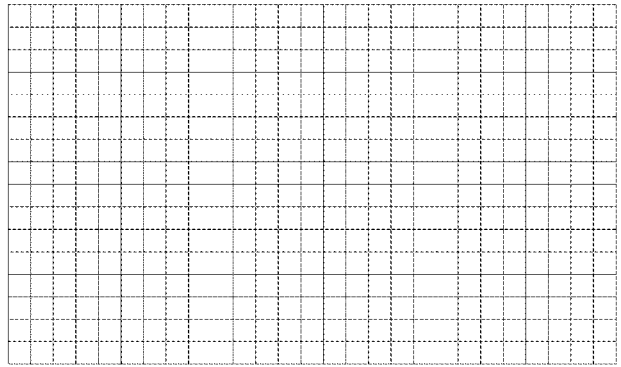
FIG.23A INPUT IMAGE

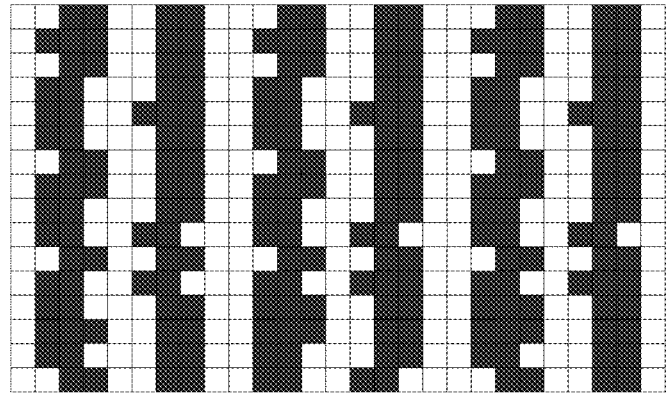
FIG.24C PIXEL INSERTION DISPERSING PROCESS
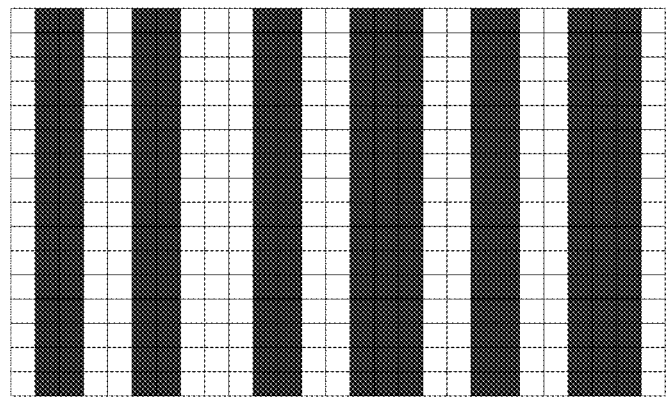
FIG.24B PIXEL INSERTION PROCESS (SIMPLE)
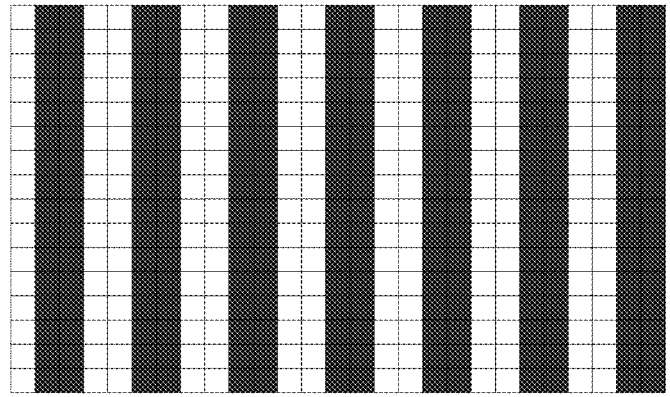
FIG.24A INPUT IMAGE

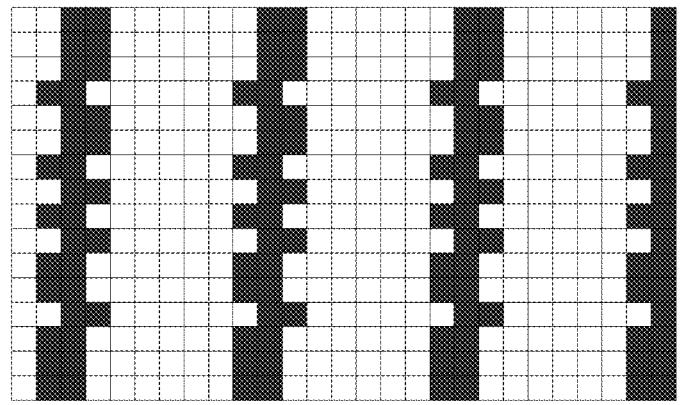
FIG.25C SHIFT DISPERSION PROCESS
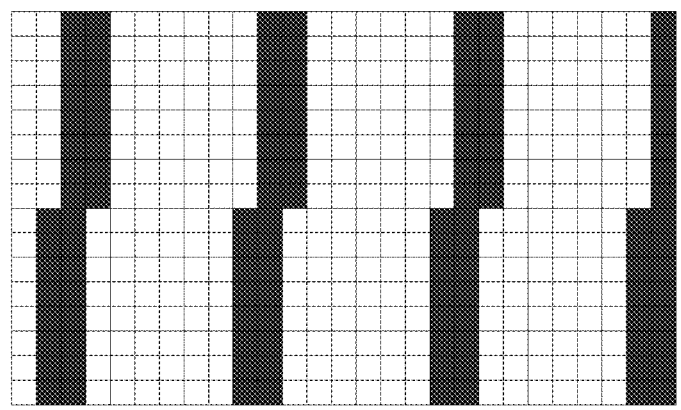
FIG.25B SIMPLE PROCESS
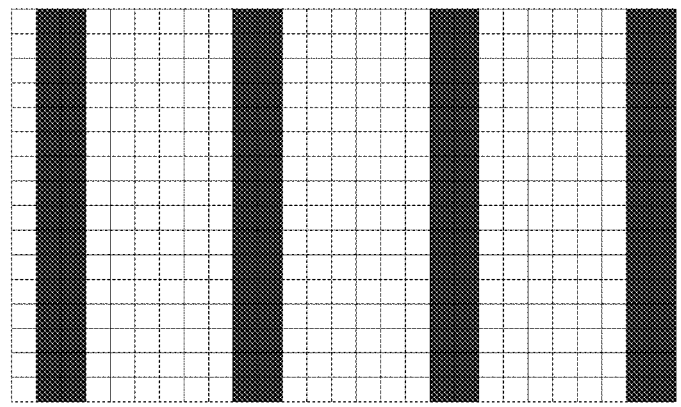
FIG.25A INPUT IMAGE

PIXEL INSERTION DISPERSING PROCESS + SHIFT DISPERSION PROCESS

PIXEL INSERTION DISPERSING PROCESS

INPUT IMAGE

IMAGE DEFORMATION PROCESSING DEVICE AND IMAGE DEFORMATION PROCESSING METHOD

BACKGROUND OF THE INVENTION

1. Field of the Invention

The present invention relates to an image deformation processing device and an image deformation processing method for carrying out the deformation process for an image, such as the fine variable magnification, the shift process or the like.

2. Description of Related Art

In an image output apparatus or the like using the electrophotographic process, the positional displacement, such as the fine displacement of the image position or the magnification between the front surface and the back surface of the recording paper, the image positional displacement between the colors (misregistration) and the like, is caused by the fixing irregularity and irregularity in the paper conveyance. In order to correct the above positional displacement, the deformation process for deforming an image in two-dimension, such as the shift, the rotation, the enlargement/reduction of an image and the like, is carried out.

As the deformation process, the enlargement/reduction process for the image is realized by inserting or deleting pixels. For example, in case that an image having a dot matrix form in which the pixels are arranged in a grid form extending in two directions which are perpendicular to each other (one direction is referred to as the main scanning direction (the horizontal direction or the line direction) and the other direction is referred to as the sub-scanning direction (or the vertical direction)) is enlarged in the sub-scanning direction, in a simple nearest neighbor algorithm, as shown in FIG. 23B, pixels are concurrently inserted in the identical line (in the main scanning direction) in each interpolation period. FIGS. 23A to 23C show an example in which the original image shown in FIG. 23A is enlarged in the sub-scanning direction by 8/7 times. In FIG. 23B, pixels constituting one line are inserted at intervals of 7 lines.

When the variable magnification is carried out in the above method, because the pixel insertion positions are arranged on the identical line, the texture is caused by a certain type of regularity in the image. For example, when the original image in which the stripes are drawn as shown in FIG. 24A is variably magnified in the pixel insertion method shown in FIG. 23B, the stripes become bold periodically as shown in FIG. 24B. As a result, the image quality is deteriorated.

Therefore, as shown in FIG. 23C, a method in which the pixel insertion/deletion positions in the image are dispersed is adopted. It is considered that the above method is the most preferable for the image quality in the electrophotographic process. FIG. 24C shows the image obtained by variably magnifying the original image shown in FIG. 24A by using the method in which the pixel insertion positions are dispersed as shown in FIG. 23C (pixel insertion dispersing process). As the concrete method for dispersing the pixel insertion positions, for example, the following method is disclosed in Japanese Patent Application Publication No. 2006-270149. In the method, the pattern for dispersing the pixel insertion positions or the pixel deletion positions is defined in the matrix having N pixels×M pixels, and the pixel insertion positions or the pixel deletion positions are determined in the whole of image data by repeatedly applying the above matrix.

On the other hand, also in case that the image is shifted in the rotation process, the skew/bow correction process or the like for the image, it is known that the method for dispersing the shift amount stochastically in the horizontal direction is preferable in the electrophotographic process. For example, when the simple skew/bow correction process (simple process) is carried out for the original image in which the stripes are drawn as shown in FIG. 25A, the steps caused at the specific positions in the main scanning direction in the stripes as shown in FIG. 25B are conspicuous. However, when the shift dispersion process for dispersing the shift amount stochastically in the horizontal direction is carried out, the image shown in FIG. 25C is obtained. In case that the image is printed in the electrophotographic process, the steps become inconspicuous.

In the deformation process for adjusting the positions of the images to be printed on the front surface and the back surface of the recording paper, it is necessary to form the final image in view of a plurality of correction elements (the rotation, the enlargement/reduction, the skew correction, the bow correction and the like). In this case, for example, when the skew correction process is separately carried out by using the shift dispersion process for dispersing the shift amount stochastically in the horizontal direction after the enlargement process is carried out by dispersing the pixel insertion positions (or the pixel deletion positions), the steps having the difference of two pixels are caused. As a result, there is a problem in which the image quality is significantly deteriorated. FIG. 26A shows the original image in which the stripes are drawn. FIG. 26B shows the image obtained by carrying out the pixel insertion dispersing process in which the original image is enlarged by dispersing the pixel insertion positions. FIG. 26C shows the image obtained by carrying the shift dispersion process for dispersing the shift amount stochastically in the horizontal direction, for the image shown in FIG. 26B. In the portion enclosed by the circle 101 shown in FIG. 26C, the step having the difference of two pixels is caused, and the image quality is deteriorated.

SUMMARY

To achieve at least one of the abovementioned objects, an image deformation processing device reflecting one aspect of the present invention, for carrying out a deformation process for an input image having a dot matrix form in which pixels are arranged in a first direction and a second direction which is perpendicular to the first direction, so as to deform the input image in the first direction to generate an output image having the dot matrix form, wherein a coordinate system in which a distance between two adjacent pixels is 1, is defined for each of the input image and the output image, comprises:

a shift amount calculating unit configured to calculate a coordinate of the input image which is mapped to a position of a specified pixel by the deformation process, and to calculate a difference between the calculated coordinate and a coordinate of the specified pixel as a shift amount, for each specified pixel in the output image;

a dispersion threshold table in which a threshold is stored for each coordinate in the second direction; and an output unit configured to obtain the threshold corresponding to the coordinate of the specified pixel in the second direction from the dispersion threshold table, to calculate a pixel shift amount by comparing the obtained threshold with a decimal component of the shift amount for the specified pixel and by rounding up or down the decimal component of the shift amount for the specified pixel, and to output the pixel in the input image, which has a coordinate shifted from the coordinate of the specified pixel by the pixel shift amount, as the specified pixel.

Preferably, in case that the image deformation processing device carries out both a first deformation process and a second deformation process as the deformation process, the shift amount calculating unit calculates the difference between the coordinate of the input image which is mapped to the position of the specified pixel by the first deformation process and the coordinate of the specified pixel as a first shift amount, calculates the difference between the coordinate of the input image which is mapped to the position of the specified pixel by the second deformation process and the coordinate of the specified pixel as a second shift amount, and calculates the shift amount by summing the first shift amount and the second shift amount, for each specified pixel in the output image.

Preferably, the first deformation process is a variable magnification process and the second deformation process is a shift process.

Preferably, in case that a cumulative histogram of the thresholds registered in the dispersion threshold table is not linear, the image deformation processing device corrects the thresholds so as to linearize the cumulative histogram.

Preferably, in the dispersion threshold table, a threshold dispersion pattern in which the threshold is periodically changed according to a change in the coordinate in the second direction is registered, and the threshold dispersion pattern is determined by using specific frequency information in view of a visual property as a parameter.

Preferably, in the dispersion threshold table, a threshold dispersion pattern in which the threshold is periodically changed according to a change in the coordinate in the second direction is registered, and the threshold dispersion pattern is changed according to a resolution in the output image.

Preferably, in the dispersion threshold table, a threshold dispersion pattern in which the threshold is periodically changed according to a change in the coordinate in the second direction is registered, and the threshold dispersion pattern is changed according to a print property of a print apparatus for printing the output image.

Preferably, the image deformation processing device comprises a plurality of the dispersion threshold tables, and switches the dispersion threshold table to be referred when the threshold is obtained, according to an attribute of the specified pixel.

Preferably, one of the dispersion threshold tables is the dispersion threshold table in which the threshold is constant regardless of the coordinate in the second direction.

BRIEF DESCRIPTION OF THE DRAWINGS

The present invention will become more fully understood from the detailed description given hereinafter and the accompanying drawings given by way of illustration only, and thus are not intended as a definition of the limits of the present invention, and wherein:

FIGS. 5A to 5C are views showing an example of the processing contents of the shift amount resolving unit;

FIGS. 7A to 7D are views showing a specific example of the shift dispersion process carried out by the shift dispersion processing unit;

FIGS. 8A to 8C are views showing a specific example of the process carried out by the shift amount merging unit;

FIG. 9 is a view showing an example of the result obtained by calculating the pixel shift amount which is a final shift amount corresponding to each pixel in the output image;

FIGS. 11A to 11D are views showing the threshold dispersion patterns in which the histogram of the thresholds is evenly distributed, and the corresponding cumulative histograms, and the like;

FIGS. 12A to 12C are views showing the corrected images obtained by carrying out the shift dispersion process using the dispersion threshold LUT registering the threshold dispersion pattern in which the histogram of the thresholds is concentrated around the middle value of the thresholds, and the like;

FIG. 13 is a view showing the situation in which the result of the histogram is normalized in the threshold range;

FIGS. 14A to 14D are views showing an example of the output image in case that the threshold dispersion pattern having the peaks in the high frequency component is applied;

FIGS. 18A and 18B are views showing an example of the image obtained by carrying out the enlargement process in which the pixel insertion positions are determined by using the threshold dispersion pattern shown in FIG. 17A;

FIGS. 22A to 22C are views showing an example of the output image obtained by carrying out the deformation process in which the dispersion threshold LUT is switched according to the judgment information relating to the pixel, and the like;

FIGS. 23A to 23C are views showing the pixel insertion positions in the simple pixel insertion process and the pixel insertion dispersing process;

FIGS. 24A to 24C are views showing an example of the image obtained by carrying out the simple pixel insertion process for the input image in which the stripes are drawn, and an example of the image obtained by carrying out the pixel insertion dispersing process for the input image in which the stripes are drawn;

FIGS. 25A to 25C are views showing an example of the image obtained by carrying out the shift process using the simple process in the skew/bow correction, and an example of the image obtained by carrying out the shift process using the shift dispersion process in the skew/bow correction.

DETAILED DESCRIPTION OF PREFERRED EMBODIMENTS

Hereinafter, a preferred embodiment of the present invention will be explained with reference to the accompanying drawings.

The image deformation processing device according to the embodiment, carries out the process for carrying out the fine variable magnification for an input image, the shift process for slightly rotating an image to correct the skew and the bow in an input image, and the like.

The image to be processed is an image having the dot matrix form in which the pixels are arranged in the first direction and the second direction which is perpendicular to the first direction. Further, the output image is also an image having the dot matrix form in which the pixels are arranged in the first direction and the second direction which is perpendicular to the first direction. In this embodiment, the first direction is the sub-scanning direction (vertical direction), and the second direction is the main scanning direction (horizontal direction). The fine variable magnification and the shift process are carried out in the sub-scanning direction.

In case that the deformation process, such as the fine variable magnification and the shift process and the like, is carried out, the following coordinate system is defined.

Figure 1:
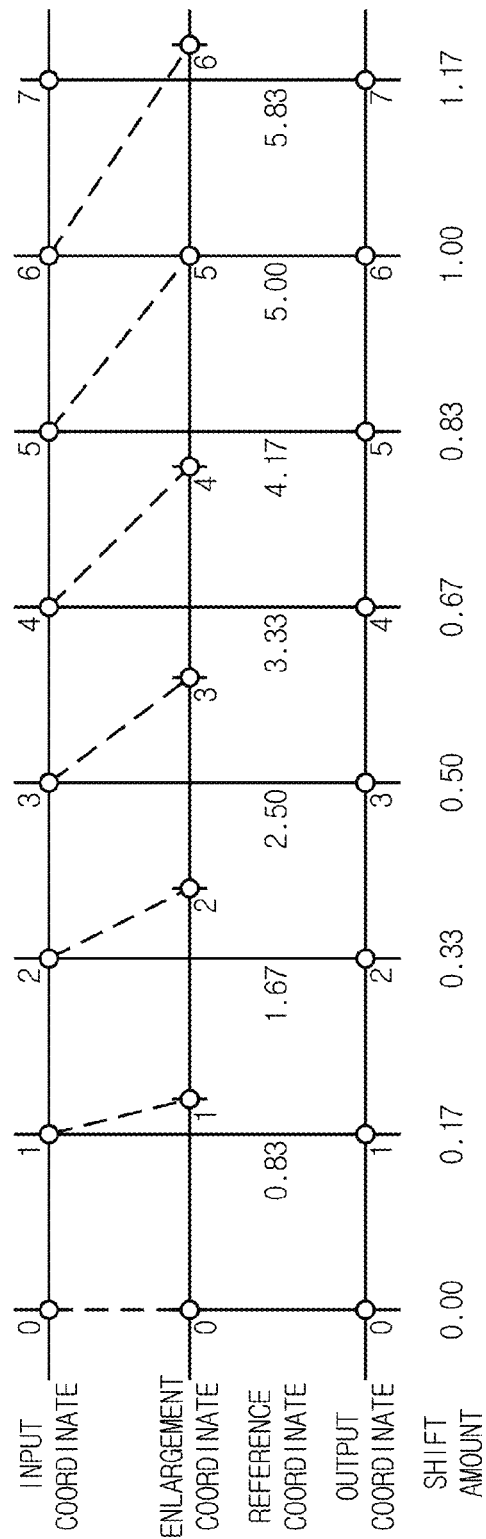
FIG. 1 is an explanatory view showing the coordinate system in the enlargement process.

As shown in FIG. 1, the coordinate system in which the distance between two adjacent pixels in an input image is 1, is referred to as the input coordinate system. The coordinate in the input coordinate system is referred to as the input coordinate. In the input coordinate system, each pixel of the input image is positioned on the input coordinate which is expressed by the integer, such as 0, 1, 2, 3 and the like.

The coordinate system obtained by carrying out the deformation process which is the same as the deformation process for deforming the input image, for the input coordinate system, is referred to as the deformed coordinate system. In particular, in case that the deformation process is the enlargement process, the deformed coordinate system is referred to as the enlarged coordinate system. The coordinate in the enlarged coordinate system is referred to as the enlargement coordinate. For example, in case that the original image is enlarged by 1.2 times, the coordinate system obtained by enlarging the input coordinate system by 1.2 times, is the enlarged coordinate system.

The coordinate system in which the distance between two adjacent pixels in an output image is 1, is referred to as the output coordinate system. In this embodiment, the output coordinate system is the coordinate system having the same scale and the same phase as the input coordinate system. The coordinate in the output coordinate system is referred to as the output coordinate. When the position corresponding to the specified output coordinate is expressed as the coordinate in the deformed coordinate system (for example, the enlarged coordinate system, the shift coordinate system which will be described later, and the like), the coordinate of the above expressed position is referred to as the reference coordinate corresponding to the specified output coordinate. For example, in the example shown in FIG. 1, the reference coordinate which corresponds to the position having the output coordinate of "1" is 0.83. In case that the deformation process is carried out for the input image, the reference coordinate indicates the coordinate of the input image which is mapped to the position having the specified output coordinate. For example, in case that the input image is enlarged by 1.2 times, the input image which is arranged in the position having the input coordinate of 0.83 is mapped to the position having the output coordinate of 1. In other words, the reference coordinate is the input coordinate to be assigned to the output coordinate after the deformation process is carried out.

When the reference coordinate corresponding to the output coordinate is calculated, the input pixel arranged in the input coordinate, which is referred for each output coordinate can be recognized.

The relative value of the reference coordinate corresponding to the specified output coordinate, to the specified output coordinate is referred to as the shift amount. The shift amount is calculated by subtracting the reference coordinate from the output coordinate.

Figure 2:
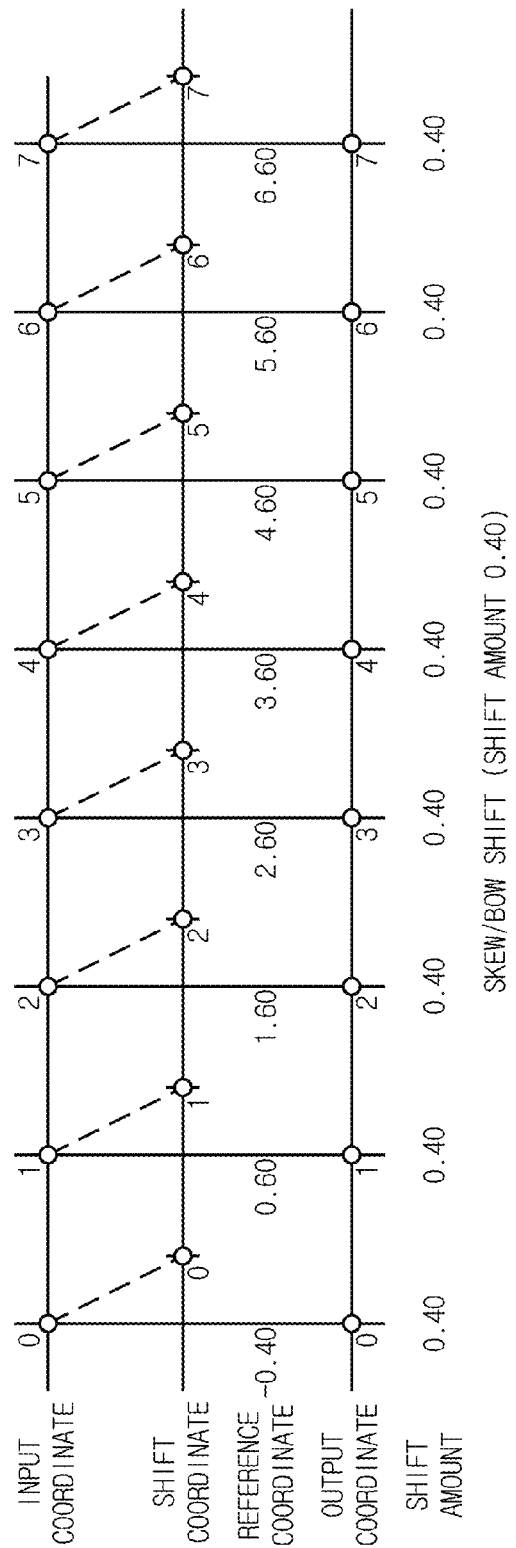
FIG. 2 is an explanatory view showing the coordinate system in the shift process.

FIG. 2 shows the relation among the coordinate systems in case that the shift process for the skew/bow correction is carried out as the deformation process. In case that the deformation process is the shift process, the deformed coordinate system is particularly referred to as the shift coordinate system. The coordinate in the shift coordinate system is referred to as the shift coordinate. For example, in case that the shift process is carried out by the shift amount of 0.4 pixel, the coordinate obtained by wholly shifting the input coordinate system by the shift amount of 0.4 pixel, is the shift coordinate system.

Like the enlargement process, when the position corresponding to the specified output coordinate is expressed as the coordinate in the shift coordinate system, the coordinate of the above expressed position becomes the reference coordinate corresponding to the specified output coordinate. For example, in the example shown in FIG. 2, the reference coordinate which corresponds to the position having the output coordinate of "1" is 0.60. Further, the shift amount is 0.4 which is obtained by subtracting 0.6 from 1. In case of the shift process, the shift amount for the all of the output coordinates which are arranged in the identical main scanning direction is 0.4.

Figure 3:
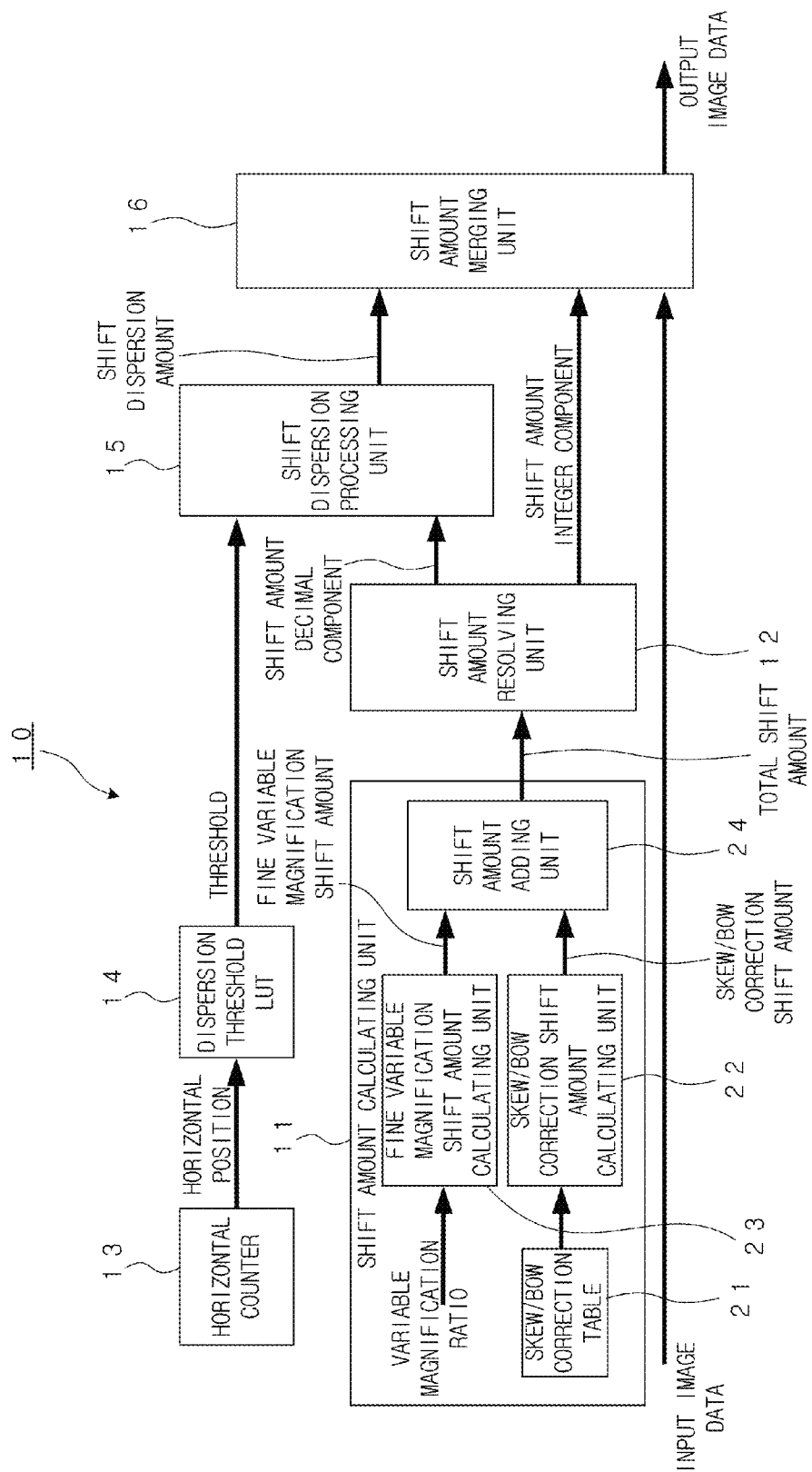
FIG. 3 is a block diagram showing the schematic configuration of the image deformation processing device according to the embodiment.

FIG. 3 is a block diagram showing the schematic configuration of the image deformation processing device 10 according to the embodiment. The image deformation processing device 10 is configured so as to simultaneously carry out the skew/bow correction and the fine variable magnification in the deformation process in which the input image is deformed in the sub-scanning direction.

The image deformation processing device 10 comprises a shift amount calculating unit 11, a shift amount resolving unit 12, a horizontal counter 13, a dispersion threshold LUT (look-up table) 14, a shift dispersion processing unit 15 and a shift amount merging unit 16. The shift amount calculating unit 11 comprises a skew/bow correction table 21, a skew/bow correction shift amount calculating unit 22, a fine variable magnification shift amount calculating unit 23 and a shift amount adding unit 24. These units are configured by the hardware, such as logic circuits, adders, sequencers and the like.

The shift amount calculating unit 11 calculates the shift amount corresponding to the output coordinate of each pixel of the output image. The fine variable magnification shift amount calculating unit 23 calculates the shift amount for the specified pixel, which is caused by the fine variable magnification in accordance with the designated variable magnification ratio (fine variable magnification shift amount).

In the skew/bow correction table 21, the skew/bow correction profile which indicates the correction amount for the skew/bow in each position along the main scanning direction, is registered. The correction amount is registered for each position along the main scanning direction. The skew/bow correction shift amount calculating unit 22 calculates the shift amount which is caused by the skew/bow in the specified pixel (skew/bow correction shift amount).

The shift amount adding unit 24 adds the fine variable magnification shift amount which is output by the fine variable magnification shift amount calculating unit 23, to the skew/bow correction shift amount which is output by the skew/bow correction shift amount calculating unit 22, and outputs the value obtained by adding the above two shift amounts, as the total shift amount. In case that both the fine variable magnification and the skew/bow correction are carried out, the total shift amount is the shift amount for the specified pixel.

That is, the shift amount calculating unit 11 calculates the coordinate of the input image which is mapped to the position of the specified pixel by the deformation process, such as the fine variable magnification process (the first deformation process), the shift process (the second deformation process) or the like, and calculates the difference between the calculated coordinate and the coordinate of the specified pixel as the shift amount, for each specified pixel in the output image.

The shift amount resolving unit 12 resolves the shift amount for the specified pixel into the component of the one-pixel unit (shift amount integer component, or pixel unit of the shift amount) and the component of less than one pixel (shift amount decimal component, or shift amount of less than one pixel). The shift amount decimal component is output within the range: 1>shift amount decimal component≥0. The value of the shift amount decimal component may be output by replacing the above range, for example, by the range from 0 to 255 because of the processing in the image deformation processing device 10.

The horizontal counter 13 outputs the position of the specified pixel in the main scanning direction (horizontal position or the main scanning position). In this embodiment, when the horizontal synchronization signal is ON, the horizontal counter 13 counts the clock pulse for each pixel, and outputs the number of the counted clock pulses as the information indicating the main scanning position.

The dispersion threshold LUT 14 is a table for registering the thresholds which are predetermined for the main scanning positions, respectively. Each of the thresholds has the value ranging from 0 to 1. The detailed explanation thereof will be described.

The shift dispersion processing unit 15 obtains the thresholds for the main scanning positions, from the dispersion threshold LUT 14 and compares the obtained threshold with the shift amount decimal component for each main scanning position. When the shift amount decimal component is less than the threshold, the shift dispersion processing unit 15 outputs 0 as the shift dispersion amount. On the other hand, when the shift amount decimal component is not less than the threshold, the shift dispersion processing unit 15 outputs 1 as the shift dispersion amount. That is, the shift dispersion processing unit 15 carries out the processing for rounding the value after the decimal point.

The shift amount merging unit 16 adds the shift dispersion amount for the specified pixel to the shift amount integer component (pixel unit of the shift amount) for the specified pixel, and calculates the pixel shift amount which is the final shift amount. By outputting the corresponding input image in accordance with the pixel shift amount, the deformation process is finished. In detail, the shift amount merging unit 16 outputs the output image data obtained by setting the pixel value of the pixel in the input image, which has the same coordinate in the main scanning direction as the specified pixel and which has the coordinate in the sub-scanning direction, which is obtained by subtracting the pixel shift amount from the coordinate of the specified pixel in the sub-scanning direction, to the pixel value of the specified pixel.

Therefore, at least the shift dispersion processing unit 15 and the shift amount merging unit 16 constitutes the output unit for obtaining the threshold corresponding to the coordinate of the specified pixel in the main scanning direction from the dispersion threshold LUT 14, for calculating the pixel shift amount by comparing the obtained threshold with the decimal component of the shift amount for the specified pixel and by rounding up or down the decimal component of the shift amount for the specified pixel, and for outputting the pixel in the input image, which has the coordinate shifted from the coordinate of the specified pixel by the pixel shift amount, as the specified pixel.

Figure 4:
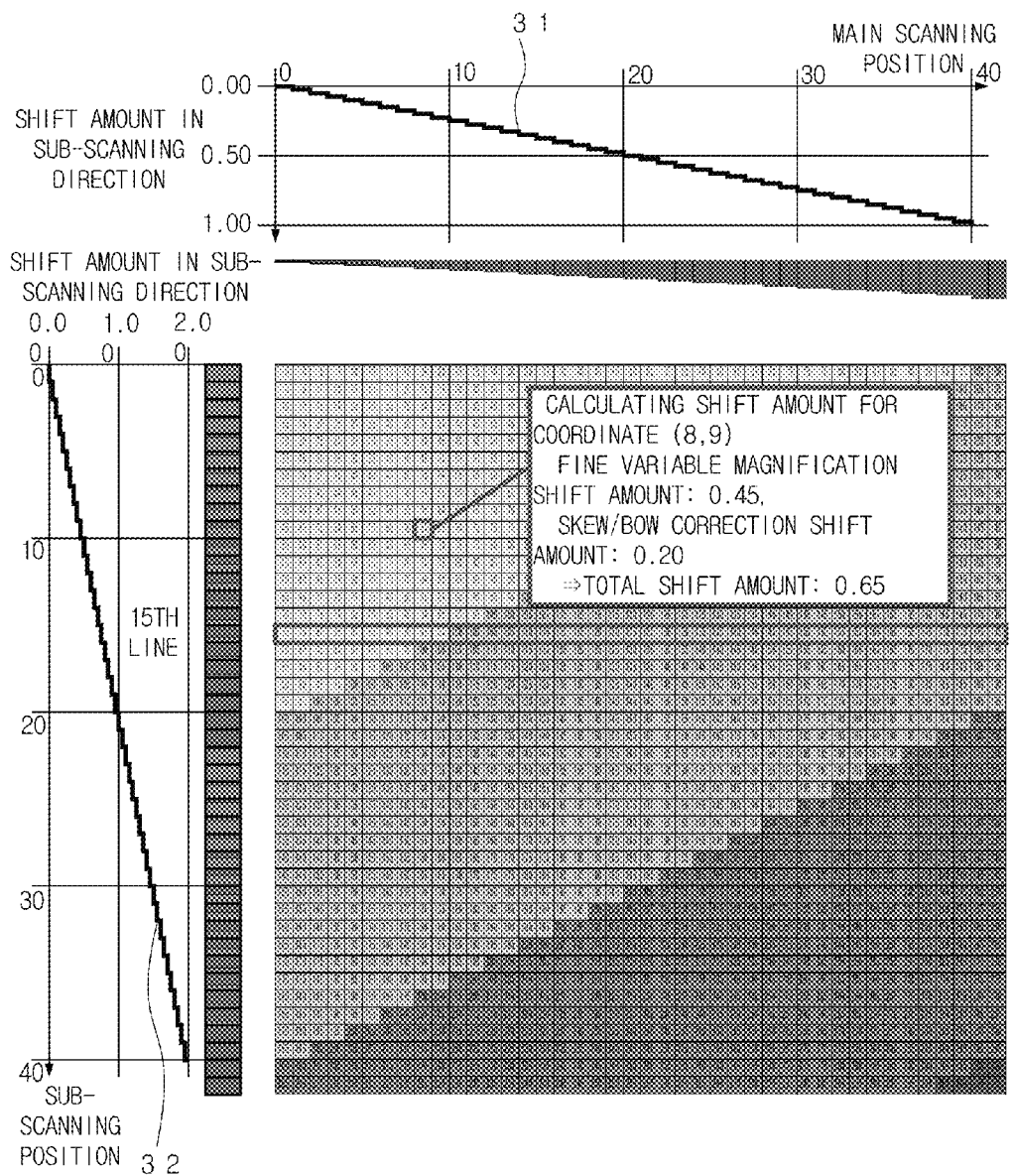
FIG. 4 is a view showing an example of the result obtained by calculating the total shift amount corresponding to each pixel in the output image.

FIG. 4 shows an example of the result obtained by calculating the total shift amount corresponding to each pixel in the output image. The graph 31 shown in the upper side of the drawing shows the shift amount for each main scanning position, which is caused by the skew/bow correction (skew/bow correction shift amount (second shift amount)). The graph 32 shown in the left side of the drawing shows the shift amount for each position in the sub-scanning direction, which is caused by the fine variable magnification in the sub-scanning direction (fine variable magnification shift amount (first shift amount)). In the portion corresponding to each pixel in the output image, the value obtained by centupling the value of the total shift amount for the pixel is shown.

For example, in case of the specified pixel having the coordinate (8, 9), the fine variable magnification shift amount is 0.45 and the skew/bow correction shift amount is 0.20. Therefore, the sum of the above shift amounts is 0.65 which is the total shift amount. In the drawing, the output image is color-coded according to the value of the integer component of the total shift amount.

That is, the shift amount calculating unit 11 calculates the difference between the coordinate of the input image which is mapped to the position of the specified pixel by the variable magnification process (first deformation process) and the coordinate of the specified pixel, as the variable magnification shift amount (first shift amount), calculates the difference between the coordinate of the input image which is mapped to the position of the specified pixel by the shift process (second deformation process) and the coordinate of the specified pixel, as the skew/bow correction shift amount (second shift amount), and calculates the total shift amount by adding the variable magnification shift amount to the skew/bow correction shift amount.

FIGS. 5A to 5C show an example of the processing contents of the shift amount resolving unit 12. FIG. 5A shows the relation between the main scanning position and the total shift amount for each pixel in the 15th line shown in FIG. 4, which is input from the shift amount calculating unit 11 to the shift amount resolving unit 12. However, in FIGS. 5A to 5C, each of the skew/bow correction shift amounts is twice as much as that shown in FIG. 4.

FIG. 5B shows the relation between the main scanning position and the shift amount integer component (pixel unit of the shift amount) output by the shift amount resolving unit 12. FIG. 5C shows the relation between the main scanning position and the shift amount decimal component (shift amount of less than one pixel) output by the shift amount resolving unit 12.

Figure 6:
FIG. 6 is a view showing an example of the registered contents (threshold dispersion pattern) in the dispersion threshold LUT.

FIG. 6 shows an example of the registered contents in the dispersion threshold LUT 14. In an example shown in FIG. 6, the threshold dispersion pattern in which the main scanning positions of 16 pixels arranged in the main scanning direction are related to the thresholds for the above main scanning positions, is registered. The threshold dispersion pattern is repeatedly used for every 16 pixels arranged in the main scanning direction. The thresholds are arbitrarily dispersed within the range of not less than 0 and less than 1.

FIGS. 7A to 7D show a specific example of the shift dispersion process carried out by the shift dispersion processing unit 15. FIGS. 7A to 7D show the case in which the shift dispersion processing unit 15 carries out the shift dispersion process for the shift amount decimal components in the 15th line shown in FIG. 5C by referring the dispersion threshold LUT 14 shown in FIG. 6. FIG. 7A shows the data of the shift amount decimal component (shift amount of less than one pixel) to be processed. FIG. 7B shows the graph obtained by overlapping the threshold dispersion pattern in the dispersion threshold LUT 14, which is shown in FIG. 6, with the data shown in FIG. 7A. FIG. 7C shows the result (shift dispersion amount) obtained by converting the shift amount decimal component into 0 when the shift amount decimal component is less than the threshold, and by converting the shift amount decimal component into 1 when the shift amount decimal component is not less than the threshold. FIG. 7D shows the situation in which each pixel is shifted in accordance with the shift dispersion amount.

FIGS. 8A to 8C show a specific example of the process carried out by the shift amount merging unit 16. FIG. 8A shows the graph indicating the shift dispersion amount for each pixel, which is input from the shift dispersion processing unit 15, and the situation in which each pixel is shifted in accordance with the shift dispersion amount.

FIG. 8B shows the graph indicating the shift amount integer component for each pixel (pixel unit of the shift amount) which is input from the shift amount resolving unit 12 to the shift amount merging unit 16, and the situation in which each pixel is shifted in accordance with the shift amount integer component. FIG. 8C shows the graph indicating the shift amount for each pixel, which is obtained by synthesizing the graph indicating the shift dispersion amount shown in FIG. 8A with the graph indicating the shift amount integer component shown in FIG. 8B, and the situation in which each pixel is shifted in accordance with the synthesized shift amount.

Figure 10:
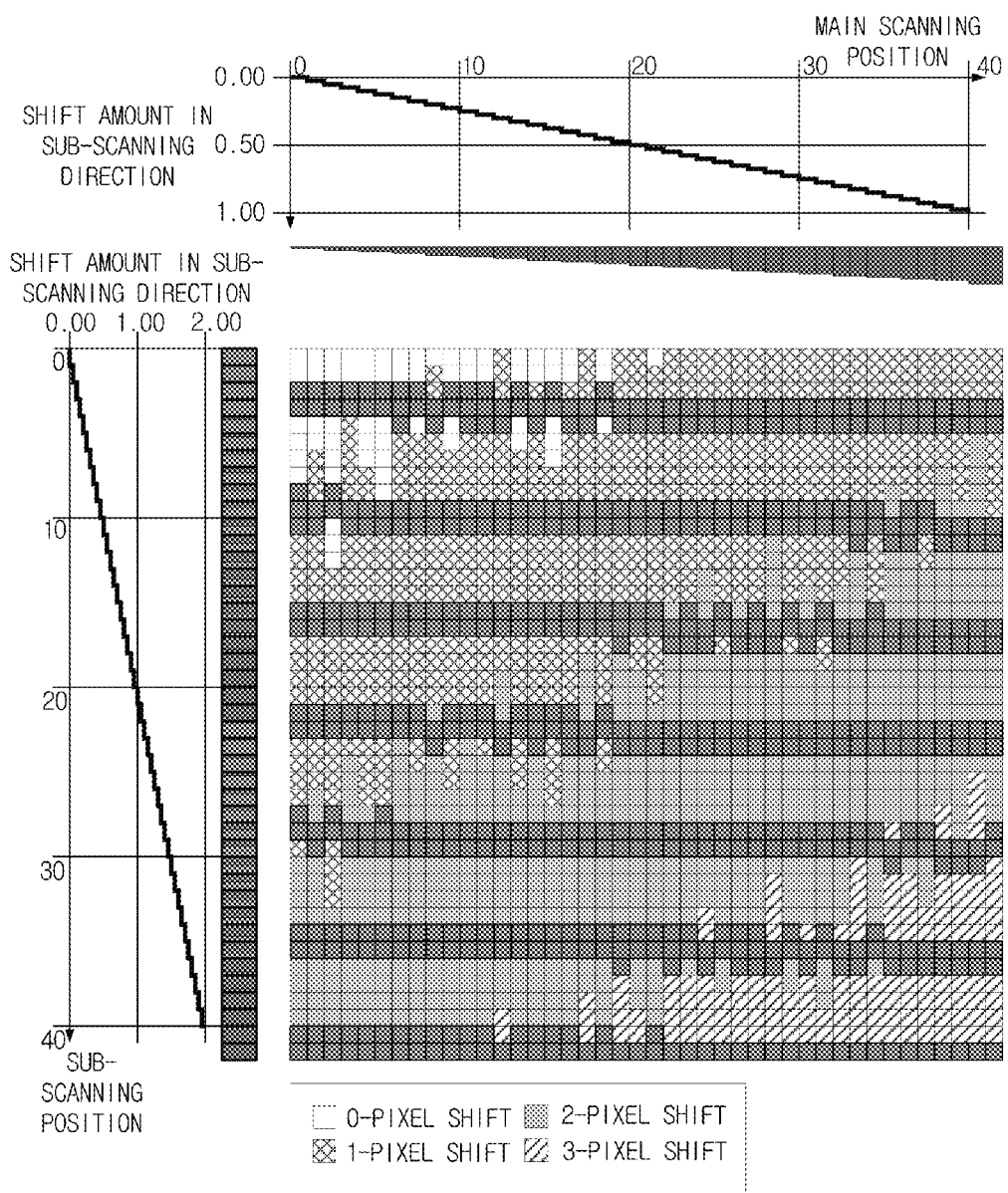
FIG. 10 is a view showing an example of the output image obtained by carrying out the pixel shift in accordance with the pixel shift amount.

FIG. 9 shows an example of the result obtained by calculating the final shift amount (pixel shift amount) corresponding to each pixel in the output image. FIG. 10 shows an example of the output image obtained by carrying out the pixel shift in accordance with the calculated pixel shift amount. In FIG. 10, the output image obtained by carrying out the fine variable magnification and the skew/bow correction for the original image in which the stripes are drawn, is overlapped with the result shown in FIG. 9.

Next, the correction of the registered data in the dispersion threshold LUT 14 will be explained.

In this process, it is preferable that the thresholds registered in the dispersion threshold LUT 14 are evenly distributed, that is, the cumulative histogram thereof is linear. FIG. 11A shows the threshold dispersion pattern in which the histogram of the thresholds is evenly distributed. FIG. 11B shows the cumulative histogram corresponding to the histogram shown in FIG. 11A. FIG. 11C shows the threshold dispersion pattern in which the histogram of the thresholds is concentrated around the middle value of the thresholds. FIG. 11D shows the cumulative histogram corresponding to the histogram shown in FIG. 11C.

Figure 12A:
Figure 12B:
Figure 12C:

FIG. 12A shows an example of the image which has not been corrected by the shift dispersion process. FIG. 12B shows the image which is corrected by the shift dispersion process using the dispersion threshold LUT 14 registering the threshold dispersion pattern in which the thresholds are evenly distributed. FIG. 12C shows the image which is corrected by the shift dispersion process using the dispersion threshold LUT 14 registering the threshold dispersion pattern in which the histogram of the thresholds is concentrated around the middle value of the thresholds. As shown in FIGS. 11C and 11D, in case that the thresholds are biased to a certain value, the proportional relation between the shift amount and the number of the thresholds which exceed the shift amounts is not held. Therefore, for example, as shown in FIG. 12C, the horizontal line is distorted by a simple inclination correction, or the like. In FIG. 12C, the step positions are biased to the center portion of the image, and the shape of the straight line of the original image cannot be maintained. As a result, the image is distorted.

For the convenience of the generation of the thresholds, in case that the histogram of the thresholds is not evenly distributed, as shown in FIG. 13, the cumulative histogram is linearized by the threshold conversion using the normalized histogram obtained by normalizing the result of the histogram in the threshold range. That is, in case that the cumulative histogram of the thresholds registered in the dispersion threshold LUT 14 is not linear, the image deformation processing device 10 corrects the thresholds so as to linearize the cumulative histogram. Thereby, the program relating to the above distortion is solved.

Next, the use of the dispersion threshold LUT 14 having the specific frequency information in view of the visual property and the print process property, will be explained.

In this process, the step positions in which the steps are caused by the pixel shift are determined according to the threshold dispersion pattern registered in the dispersion threshold LUT 14. When the threshold dispersion pattern registered in the dispersion threshold LUT 14 has a high frequency component, more steps are caused. At this time, if the step interval is very small, the steps become inconspicuous due to the visual property (a human does not have a sensitivity for the high frequency component) and the print process property (for example, in case of the electrophotographic process, the printed image is blurred by adhering the toner around the spot position). As a result, the unevenness is effectively prevented from being caused on the horizontal lines or the like.

Specifically, it is preferable that the pattern having the strong spectrum in the high frequency, such as the blue noise, is used as the threshold dispersion pattern registered in the dispersion threshold LUT 14.

In FIGS. 14A to 14D, the threshold dispersion pattern having the peaks in the high frequency component as shown in FIG. 14B, is applied for the original image in which the horizontal line shown in FIG. 14A is drawn. As a result, as shown in FIG. 14C, the image having the steps in the short period is obtained. However, when the image shown in FIG. 14C is actually printed, the printed image becomes the image in which the steps are inconspicuous as shown in FIG. 14D. As described above, when the threshold dispersion pattern having the high frequency component is used as the threshold dispersion pattern registered in the dispersion threshold LUT 14, the visibility of the steps can be suppressed.

Figure 15A:
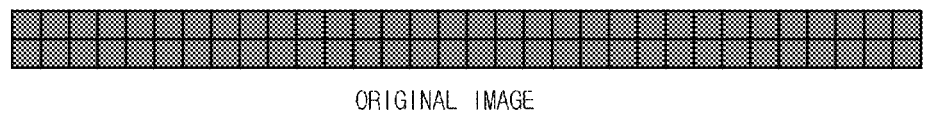
FIGS. 15A to 15D are views showing an example of the output image in case that the threshold dispersion pattern having no high frequency component is applied.
Figure 15B:
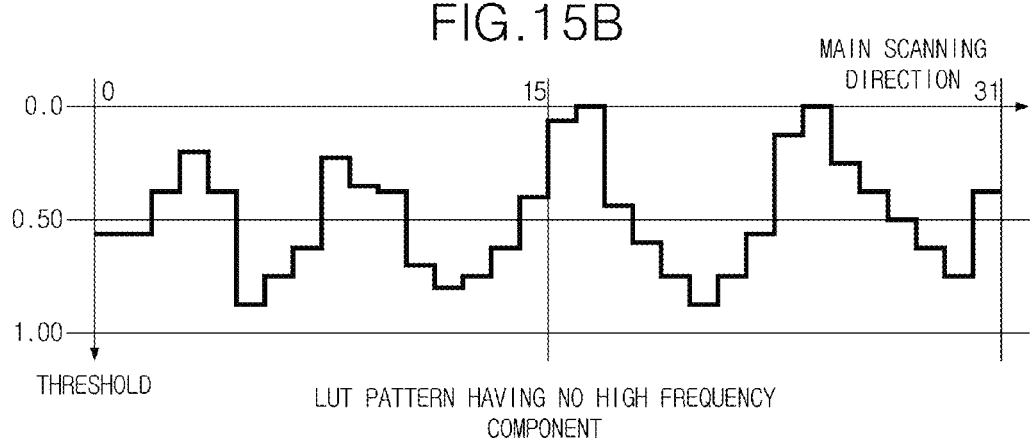
Figure 15C:
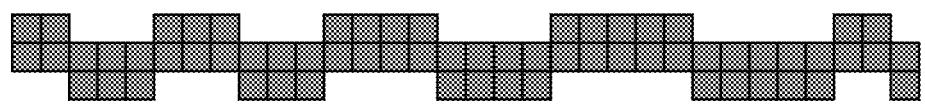
Figure 15D:

FIGS. 15A to 15D show the case in which the threshold dispersion pattern having no high frequency component as shown in FIG. 15B, is applied for the original image in which the horizontal line shown in FIG. 15A is drawn. FIG. 15C shows the image obtained by carrying out the shift dispersion process for the image shown in FIG. 15A by applying the threshold dispersion pattern shown in FIG. 15B. FIG. 15D shows the printed image which is obtained by actually printing the image shown in FIG. 15C. In the printed image shown in FIG. 15D, the steps are conspicuous as compared with the printed image shown in FIG. 14D.

That is, in the dispersion threshold LUT 14, the threshold dispersion pattern in which the threshold is periodically changed according to the change in the coordinate in the horizontal direction is registered, and the threshold dispersion pattern is determined by using the specific frequency information in view of the visual property as a parameter, for example, so as to have the high frequency component.

On the other hand, when the pattern having the strong spectrum in the high frequency component is applied as the threshold dispersion pattern registered in the dispersion threshold LUT, a fine line, such as a horizontal line having the width of 1 pixel, is often broken by the steps depending on the print process. As a result, the line density could be significantly deteriorated. Therefore, there are some cases in which the threshold dispersion pattern is preferably changed to the threshold dispersion pattern having the peak of the spectrum not in the high frequency component but in the specific frequency range, according to the print process. That is, it is preferable that in the dispersion threshold LUT 14, the threshold dispersion pattern in which the threshold is periodically changed according to the change in the coordinate in the horizontal direction is registered, and that the threshold dispersion pattern is changed according to the print property of the print apparatus for printing the output image.

Figure 16A:
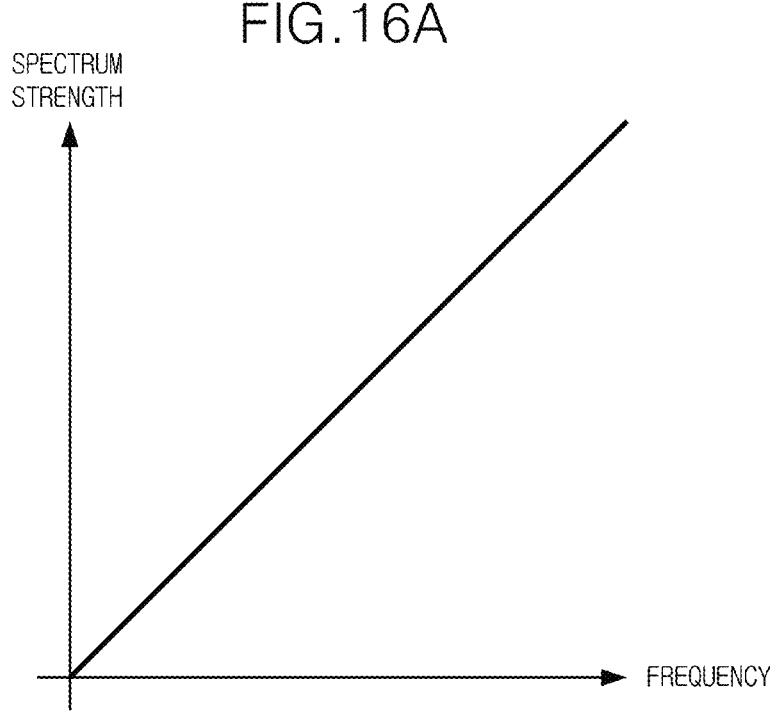
FIGS. 16A and 16B are views showing an example of the spectrum having the peak in the high frequency component and an example of the spectrum having the peak in the frequency component except the high frequency component, respectively.
Figure 16B:
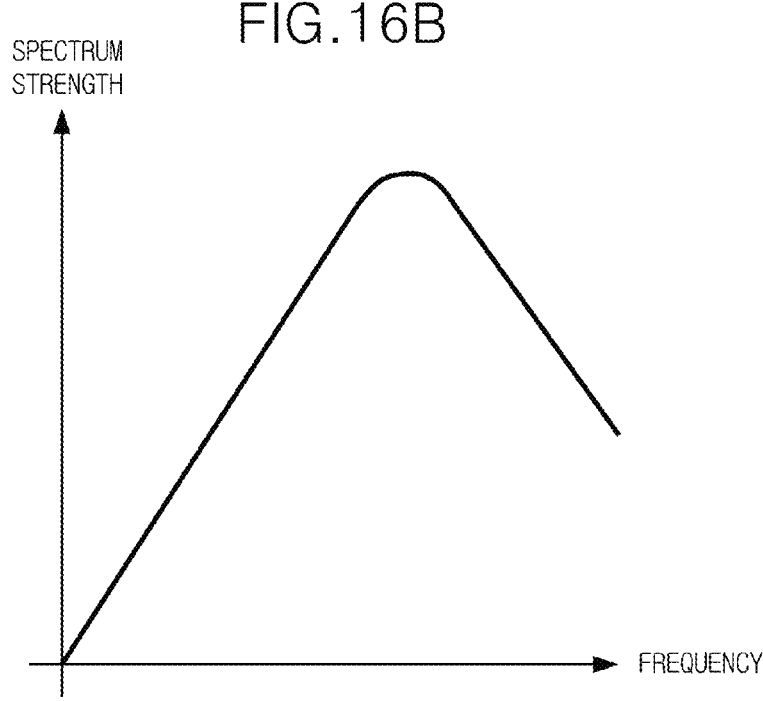

FIG. 16A shows an example of the spectrum having the peak in the high frequency component. FIG. 16B shows an example of the spectrum having the peak in the frequency component except the high frequency component.

The threshold dispersion pattern having the specific frequency component as described above, can be used as the pattern registered in the dispersion threshold LUT 14 in this specification, and is also applicable in the image deformation process. For example, in the enlargement/reduction process, the above pattern is applicable to the determination of the pixel insertion/deletion positions in the pixel insertion/deletion process. Thereby, it is possible to obtain the effect of suppressing the visibility of the steps like the image shown in FIG. 14D.

Figure 17A:
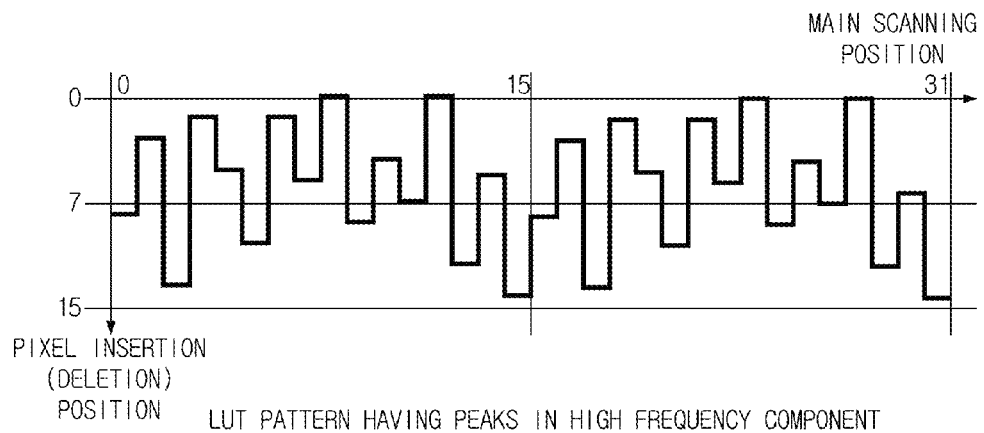
FIGS. 17A and 17B are views showing an example in which the pixel insertion positions are determined by using the threshold dispersion pattern having the peaks in the high frequency component.
Figure 17B:
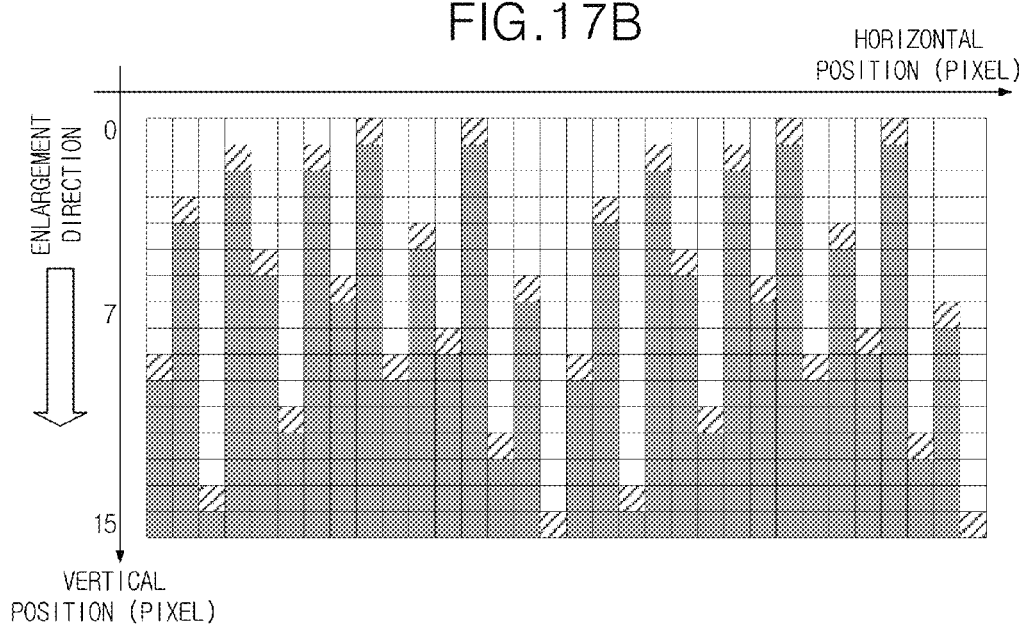

FIG. 17A shows an example of the threshold dispersion pattern for determining the pixel insertion/deletion positions. The above threshold dispersion pattern has the peaks in the high frequency component. FIG. 17B shows the pixel insertion/deletion positions obtained by using the threshold dispersion pattern shown in FIG. 17A. FIG. 18A shows the image before the enlargement process. FIG. 18B shows the image obtained by carrying out the enlargement process in which the pixel insertion positions are determined by using the threshold dispersion pattern shown in FIG. 17A.

Next, the change of the dispersion threshold LUT 14 according to the output resolution will be explained.

In case that the output resolutions are different, the characteristic of the pixel dispersion pattern for the output image is changed even though the identical dispersion threshold LUT 14 is applied. When the resolution is heightened, the variation in the pixel dispersion pattern for the output image printed by a print apparatus or the like, becomes relatively radical. However, when the variation in the pixel dispersion pattern is too radical, the isolated points are easily caused. Therefore, it is preferable that the variation in the threshold dispersion pattern is set so as to be gradual, that is, the threshold dispersion pattern is set so as to suppress the above radical variation in the pixel dispersion pattern. On the other hand, when the resolution is lowered, the variation in the pixel dispersion pattern becomes relatively gradual. In this case, the unevenness becomes conspicuous in the edge portion. Therefore, it is necessary to set the variation in the threshold dispersion pattern so as to be radical. As described above, by changing the dispersion threshold LUT 14 according to the resolution, it is possible to carry out the dispersing process which is suitable for the resolution.

Figure 19A:
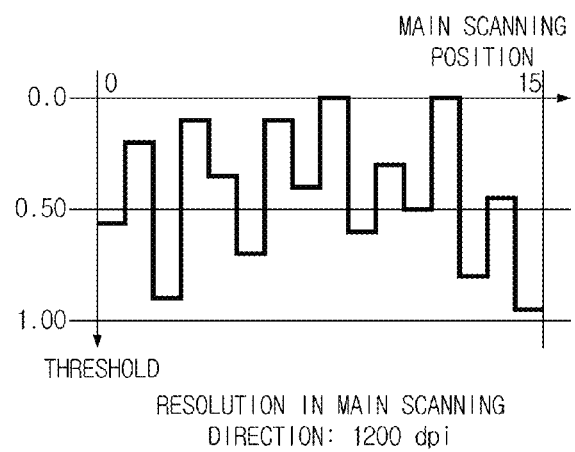
FIGS. 19A and 19B are views showing an example of the threshold dispersion pattern which is suitable for the case in which the resolution in the main scanning direction is 1200 dpi, and an example of the threshold dispersion pattern which is suitable for the case in which the resolution in the main scanning direction is 2400 dpi, respectively.
Figure 19B:
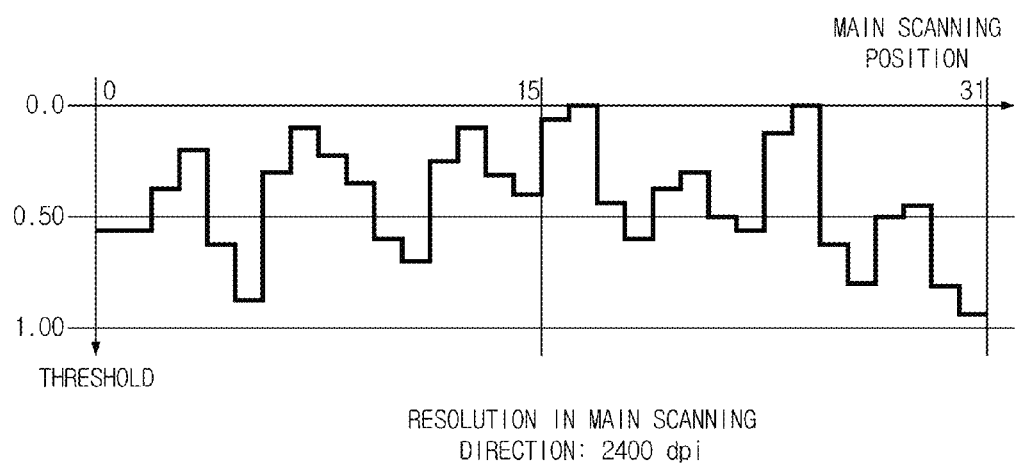

FIG. 19A shows an example of the threshold dispersion pattern which is suitable for the case in which the resolution in the main scanning direction is 1200 dpi (dot/inch). FIG. 19B shows an example of the threshold dispersion pattern which is suitable for the case in which the resolution in the main scanning direction is 2400 dpi. Alternatively, a plurality of dispersion threshold LUTs 14 may be previously prepared, and when the information relating to the output resolution is received, the shift dispersion processing unit 15 or a higher processing unit may automatically select the dispersion threshold LUT 14 which is suitable for the above output resolution. Further, in case that the output resolution of an output apparatus, such as a print apparatus, is fixed, the threshold dispersion pattern registered in the dispersion threshold LUT 14 may be determined according to the output resolution.

That is, in the dispersion threshold LUT 14, the threshold dispersion pattern in which the threshold is periodically changed according to the change in the coordinate in the horizontal direction is registered, and the threshold dispersion pattern is changed according to the resolution in the output image.

Next, the case in which the dispersion threshold LUT 14 is switched according to the attribute of the pixel, will be explained.

There are some cases in which it is preferable that the dispersing process is not carried out depending on the image area (the attribute of the specified pixel). For example, in the character area in which the characters are described, because the edge is clarified, the dispersing process is not suitable. Therefore, the character area is judged in the image or is detected by using an external tag, and a simple process is carried out for only the character area.

In this case, the first dispersion threshold LUT 14A and the second dispersion threshold LUT 14B (See FIG. 21) are provided. In the first dispersion threshold LUT 14A, the threshold dispersion pattern for the dispersing process is held. In the second dispersion threshold LUT 14B, the threshold dispersion pattern for the simple process is held. At the image process, the dispersion threshold LUT to be referred when the threshold is obtained is switched between the first dispersion threshold LUT 14A and the second dispersion threshold LUT 14B.

Figure 20A:
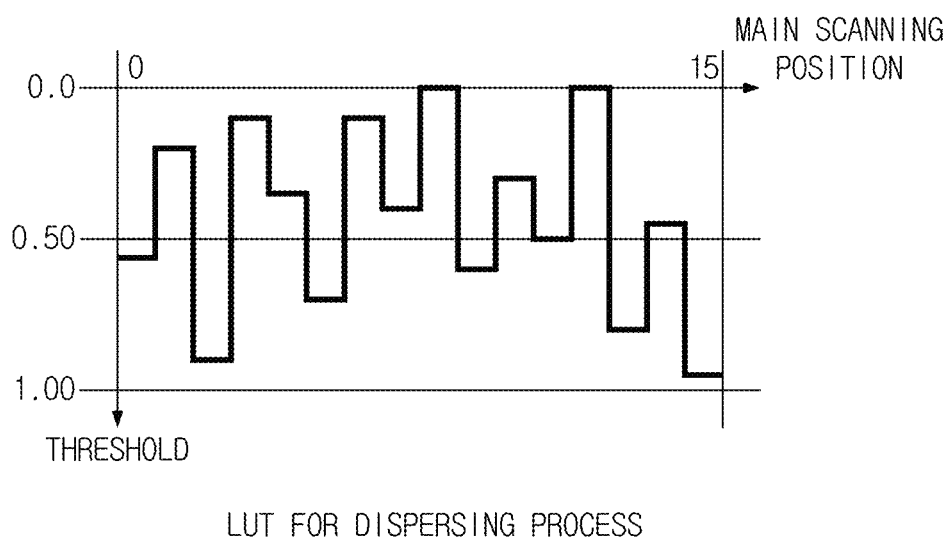
FIGS. 20A and 20B are views showing an example of the threshold dispersion pattern for the dispersing process, and an example of the threshold dispersion pattern for the simple process, respectively.
Figure 20B:
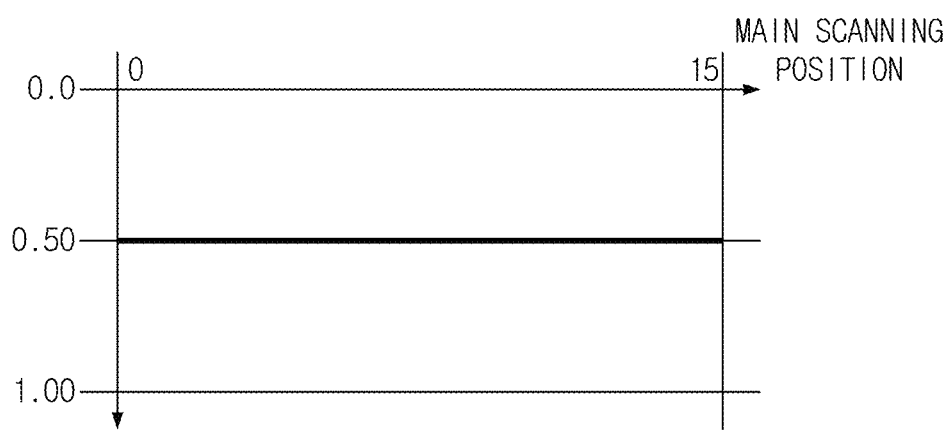

FIG. 20A shows an example of the threshold dispersion pattern for the dispersing process, which is registered in the first dispersion threshold LUT 14A. FIG. 20B shows an example of the threshold dispersion pattern for the simple process, which is registered in the second dispersion threshold LUT 14B. In the threshold dispersion pattern for the simple process, a constant threshold may be registered regardless of the position in the main scanning direction. That is, the second dispersion threshold LUT 14B is a dispersion threshold table in which the threshold is constant regardless of the coordinate in the main scanning direction.

Figure 21:
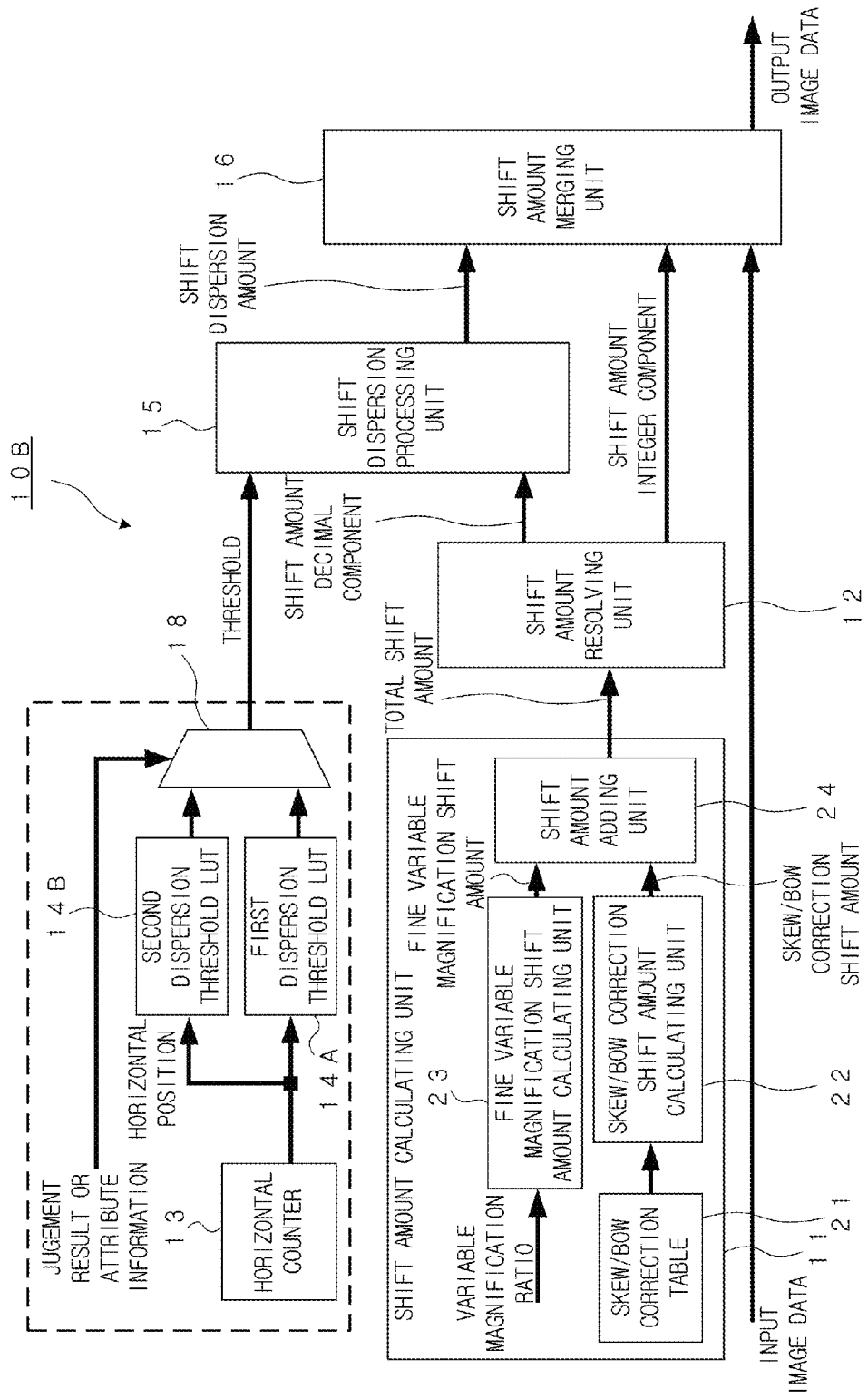
FIG. 21 is a block diagram showing the schematic configuration of the image deformation processing device in which the dispersion threshold LUT to be used is switched between the first and the second dispersion threshold LUTs according to the attribute of the pixel.
Figure 26C:
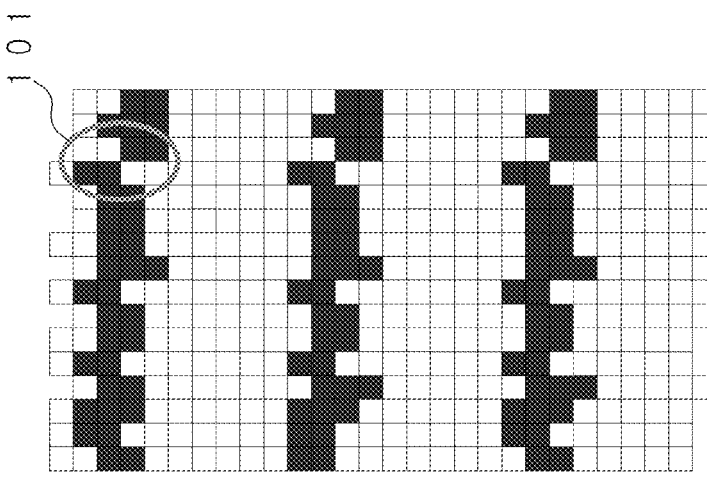
FIGS. 26A to 26C are views showing an example of the image obtained by carrying out the shift dispersion process after the pixel insertion dispersing process is carried out.
Figure 26B:
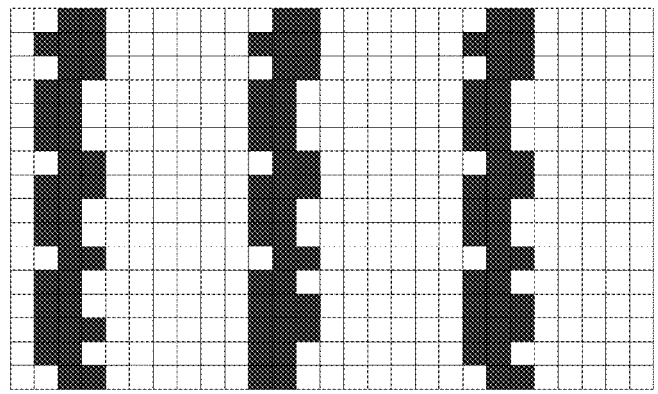
Figure 26A:
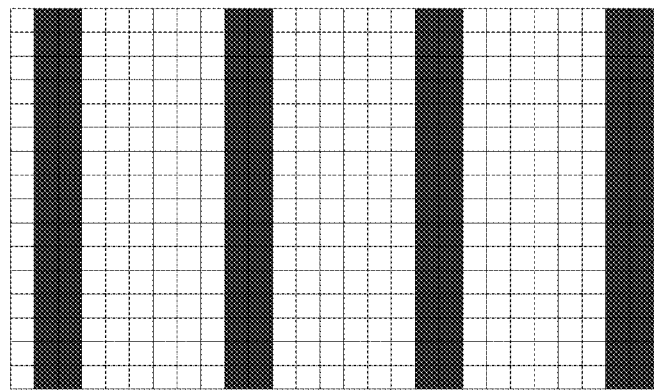

FIG. 21 shows the configuration of the image deformation processing device 10B in which the dispersion threshold LUT is switched between the first dispersion threshold LUT 14A and the second dispersion threshold LUT 14B according to the image area (the attribute of the specified pixel). The elements which are the same as those of FIG. 3 are denoted by the same reference numerals, respectively. The explanation of the same elements is omitted. Only the circuit configuration which is enclosed by a broken line in FIG. 21 is different from that of FIG. 3. The image deformation processing device 10B comprises the first dispersion threshold LUT 14A and the second dispersion threshold LUT 14B which receive the output signal from the horizontal counter 13, respectively, and a selector 18 for selecting one threshold between the thresholds which are output from the first dispersion threshold LUT 14A and the second dispersion threshold LUT 14B. The output value which is output from the selector 18 is input to the shift dispersion processing unit 15 as the threshold. The information (judgment information) indicating the judgment result for the image area or the attribute of the pixel is input to the selector 18 as the selection signal.

For example, when the attribute of the specified pixel is a character, the selector 18 selects the second dispersion threshold LUT 14B. When the attribute of the specified pixel is not a character, the selector 18 selects the first dispersion threshold LUT 14A.

FIG. 22B shows an example of the input image. FIG. 22A shows an example of the judgment information corresponding to each pixel in the input image shown in FIG. 22B. FIG. 22C shows an example of the output image obtained by carrying out the deformation process by the image deformation processing device 10B. The simple process is carried out for the pixels having the judgment information of 0 by selecting the second dispersion threshold LUT 14B. The dispersing process is carried out for the pixels having the judgment information of 1 by selecting the first dispersion threshold LUT 14A.

As described above, in each of the image deformation processing devices 10 and 10B, a plurality of shift amounts corresponding to a plurality of types of deformation processes respectively, are calculated and summed. The decimal component of the summed shift amount is rounded down or up by referring the threshold registered in the dispersion threshold LUT 14 in order to convert the summed shift amount into an integer. Therefore, the dispersing process using the dispersion threshold LUT 14 is carried out only once in a plurality of deformation processes. As a result, even though a plurality of types of deformation processes are carried out, the steps having the difference of two pixels are not caused by the pixel dispersion process. It is possible to carry out a plurality of types of deformation processes so as to obtain the excellent image quality.

Further, the common circuits (image deformation processing devices 10 and 10B) can be used both in case that only one of the variable magnification process and the skew/bow correction process is carried out as the deformation process, and in case that the above two processes are carried out.

As described above, the embodiment is explained by using the drawings. However, in the present invention, the concrete configuration is not limited to the above embodiment. In the present invention, various modifications of the above embodiment or the addition of various functions or the like to the embodiment can be carried out without departing from the gist of the invention.

In this embodiment, the enlargement/reduction process and the shift process for an image in the sub-scanning direction, are explained. However, also in case of the deformation process for deforming an image in the main scanning direction, the similar process may be carried out, basically.

In this embodiment, two types of deformation processes which are the variable magnification process and the skew/bow correction process (shift process) are simultaneously carried out. Three or more types of deformation processes may be simultaneously carried out. The type of deformation process is not limited to the variable magnification and the skew/bow correction.

The image deformation processing device 10 or 10B may carry out only one type of deformation process. In this case, by obtaining the thresholds corresponding to the positions in the main scanning direction from the dispersion threshold LUT 14, the image deformation processing device 10 or 10B can suitably carry out the dispersing process. For example, in case that only the variable magnification process is carried out, in the image deformation processing device 10, the skew/bow correction table 21, the skew/bow correction shift amount calculating unit 22 and the shift amount adding unit 24 may be removed from the configuration shown in FIG. 3, and the output value which is output from the fine variable magnification shift amount calculating unit 23 may be input to the shift amount resolving unit 12.

The threshold dispersion pattern registered in the dispersion threshold LUT 14 may be set according to the resolution or the print property of the output apparatus, and is not limited to the pattern shown in this embodiment.

In this embodiment, in the dispersion threshold LUT 14, the pattern for a part of the image in the main scanning direction, is only prepared and is repeatedly used. However, each threshold may be set to each coordinate of all pixels in the main scanning direction.

In the embodiment, the shift amount is a positive value. However, in view of the case in which the image is reduced in the variable magnification process or the case in which the pixel is shifted in the direction opposite to the shift direction shown in the embodiment by the skew/bow correction, there are some cases in which the reference coordinate is larger than the output coordinate of the specified pixel. As a result, in these cases, the shift amount which is obtained by subtracting the reference coordinate from the output coordinate is a negative value. Therefore, for example, the absolute value of the total shift amount which is output from the shift amount calculating unit 11 is calculated and the calculated absolute value is resolved into the decimal component and the integer component. The shift dispersion amount is calculated by comparing the decimal component with the threshold, and the pixel shift amount is calculated by adding the calculated shift dispersion amount to the integer component. Then, the sign of the pixel shift amount is returned to the sign of the original total shift amount. That is, in case of the original total shift amount is a negative value, the sign of the pixel shift amount is changed to the minus.

In this embodiment, the shift amount is the value obtained by subtracting the coordinate of the input image which is mapped to the position of the specified pixel by the deformation process (reference coordinate), from the coordinate of the specified pixel (output coordinate). However, the shift amount may be a value obtained by subtracting the output coordinate from the reference coordinate. In this case, the pixel in the input image, which has the coordinate having the value obtained by adding the final pixel shift amount to the coordinate of the specified pixel, may be output as the specified pixel. Because it is assumed that the shift amount is a negative value, as described above, the absolute value of the total shift amount which is output from the shift amount calculating unit 11 is calculated, and the subsequent process is carried out. Then, the sign of the pixel shift amount may be returned to the sign of the original total shift amount.

The image deformation processing device 10 or 10B may be configured as an independent device. Alternatively, the image deformation processing device 10 or 10B may be incorporated into an image forming apparatus having the print function and the copy function. In this case, the dispersion threshold LUT 14 which is suitable for the resolution and the print property of the image forming apparatus, is prepared.

One of the objects of the above embodiment is to provide an image deformation processing device and an image deformation processing method in which the image quality is not deteriorated even when a plurality of types of deformation processes are overlapped.

In this embodiment, the shift amount calculating unit calculates the difference between the coordinate of the input image which is mapped to a position of a specified pixel by the deformation process and the coordinate of the specified pixel as a shift amount, for each specified pixel in the output image. Then, the output unit obtains the threshold corresponding to the coordinate of the specified pixel in the second direction (the direction perpendicular to the deformation direction) from the dispersion threshold table, calculates the pixel shift amount by comparing the obtained threshold with a decimal component of the shift amount for the specified pixel and by rounding up or down the decimal component of the shift amount for the specified pixel, and outputs the pixel in the input image, which has a coordinate shifted from the coordinate of the specified pixel by the pixel shift amount, as the specified pixel. For example, in case that the shift amount is calculated by subtracting the coordinate of the input image which is mapped to the position of the specified pixel by the deformation process from the coordinate of the specified pixel, the pixel in the input image, which has a coordinate having the value obtained by subtracting the pixel shift amount from the coordinate of the specified pixel, is output as the specified pixel. That is, the pixel value of the input pixel which is positioned by returning back from the coordinate of the specified pixel by the pixel shift amount, is output as the pixel value of the specified pixel.

In this embodiment, the shift amount which is caused by the first deformation process and the shift amount which is caused by the second deformation process, are calculated respectively. The value obtained by summing the two shift amounts is calculated as the shift amount which is caused in case that both the first deformation process and the second deformation process are carried out.

In this embodiment, by correcting the distribution of the thresholds so as to linearize the cumulative histogram, a simple horizontal line is not distorted.

In this embodiment, the threshold dispersion pattern to be registered in the dispersion threshold table, is determined in view of the visual property.

In this embodiment, the threshold dispersion pattern is changed according to the resolution in the output image.

In this embodiment, the threshold dispersion pattern is changed according to the print property of a print apparatus for printing the output image.

In this embodiment, by switching the dispersion threshold table according to the attribute of the specified pixel, the threshold dispersion pattern is used according to the attribute of each pixel. For example, the threshold dispersion pattern is switched according to a character or the attribute except a character.

In this embodiment, when the threshold is constant, the simple process can be carried out by using the dispersion threshold table.

According to the image deformation processing device and the image deformation processing method, it is possible to carry out versatile deformation processes in which the image quality is not deteriorated even when a plurality of types of deformation processes are overlapped.

The present U.S. patent application claims the priority of Japanese Patent Application No. 2013-2291, filed on Jan. 10, 2013, according to the Paris Convention, and the entirety of which is incorporated herein by reference for correction of incorrect translation.

What is claimed is:

1. An image deformation processing device for carrying out a deformation process for an input image having a dot matrix form in which pixels are arranged in a first direction and a second direction which is perpendicular to the first direction, so as to deform the input image in the first direction to generate an output image having the dot matrix form, wherein a coordinate system in which a distance between two adjacent pixels is 1, is defined for each of the input image and the output image, the image deformation processing device comprising:

a shift amount calculating unit configured to calculate a coordinate of the input image which is mapped to a position of a specified pixel by the deformation process, and to calculate a difference between the calculated coordinate and a coordinate of the specified pixel as a shift amount, for each specified pixel in the output image;

a dispersion threshold table in which a threshold is stored for each coordinate in the second direction; and an output unit configured to obtain the threshold corresponding to the coordinate of the specified pixel in the second direction from the dispersion threshold table, to calculate a pixel shift amount by comparing the obtained threshold with a decimal component of the shift amount for the specified pixel and by rounding up or down the decimal component of the shift amount for the specified pixel, and to output the pixel in the input image, which has a coordinate shifted from the coordinate of the specified pixel by the pixel shift amount, as the specified pixel.

2. The image deformation processing device of claim 1, wherein in case that the image deformation processing device carries out both a first deformation process and a second deformation process as the deformation process, the shift amount calculating unit calculates the difference between the coordinate of the input image which is mapped to the position of the specified pixel by the first deformation process and the coordinate of the specified pixel as a first shift amount, calculates the difference between the coordinate of the input image which is mapped to the position of the specified pixel by the second deformation process and the coordinate of the specified pixel as a second shift amount, and calculates the shift amount by summing the first shift amount and the second shift amount, for each specified pixel in the output image.

3. The image deformation processing device of claim 2, wherein the first deformation process is a variable magnification process and the second deformation process is a shift process.

4. The image deformation processing device of claim 1, wherein in case that a cumulative histogram of the thresholds registered in the dispersion threshold table is not linear, the image deformation processing device corrects the thresholds so as to linearize the cumulative histogram.

5. The image deformation processing device of claim 1, wherein in the dispersion threshold table, a threshold dispersion pattern in which the threshold is periodically changed according to a change in the coordinate in the second direction is registered, and the threshold dispersion pattern is determined by using specific frequency information in view of a visual property as a parameter.

6. The image deformation processing device of claim 1, wherein in the dispersion threshold table, a threshold dispersion pattern in which the threshold is periodically changed according to a change in the coordinate in the second direction is registered, and the threshold dispersion pattern is changed according to a resolution in the output image.

7. The image deformation processing device of claim 1, wherein in the dispersion threshold table, a threshold dispersion pattern in which the threshold is periodically changed according to a change in the coordinate in the second direction is registered, and the threshold dispersion pattern is changed according to a print property of a print apparatus for printing the output image.

8. The image deformation processing device of claim 1, wherein the image deformation processing device comprises a plurality of the dispersion threshold tables, and switches the dispersion threshold table to be referred when the threshold is obtained, according to an attribute of the specified pixel.

9. The image deformation processing device of claim 8, wherein one of the dispersion threshold tables is the dispersion threshold table in which the threshold is constant regardless of the coordinate in the second direction.

10. An image deformation processing method for carrying out a deformation process for an input image having a dot matrix form in which pixels are arranged in a first direction and a second direction which is perpendicular to the first direction, so as to deform the input image in the first direction to generate an output image having the dot matrix form, wherein a coordinate system in which a distance between two adjacent pixels is 1, is defined for each of the input image and the output image, and a dispersion threshold table in which a threshold is stored for each coordinate in the second direction is provided, the image deformation processing method comprising:

calculating a coordinate of the input image which is mapped to a position of a specified pixel by the deformation process, and calculating a difference between the calculated coordinate and a coordinate of the specified pixel as a shift amount, for each specified pixel in the output image;

obtaining the threshold corresponding to the coordinate of the specified pixel in the second direction from the dispersion threshold table, calculating a pixel shift amount by comparing the obtained threshold with a decimal component of the shift amount for the specified pixel and by rounding up or down the decimal component of the shift amount for the specified pixel, and outputting the pixel in the input image, which has a coordinate shifted from the coordinate of the specified pixel by the pixel shift amount, as the specified pixel.

11. The image deformation processing method of claim 10, wherein in case that both a first deformation process and a second deformation process are carried out as the deformation process, the difference between the coordinate of the input image which is mapped to the position of the specified pixel by the first deformation process and the coordinate of the specified pixel is calculated as a first shift amount; the difference between the coordinate of the input image which is mapped to the position of the specified pixel by the second deformation process and the coordinate of the specified pixel is calculated as a second shift amount; and the shift amount is calculated by summing the first shift amount and the second shift amount, for each specified pixel in the output image.

12. The image deformation processing method of claim 11, wherein the first deformation process is a variable magnification process and the second deformation process is a shift process.

13. The image deformation processing method of claim 10, wherein in case that a cumulative histogram of the thresholds registered in the dispersion threshold table is not linear, the thresholds are corrected so as to linearize the cumulative histogram.

14. The image deformation processing method of claim 10, wherein in the dispersion threshold table, a threshold dispersion pattern in which the threshold is periodically changed according to a change in the coordinate in the second direction is registered, and the threshold dispersion pattern is determined by using specific frequency information in view of a visual property as a parameter.

15. The image deformation processing method of claim 10, wherein in the dispersion threshold table, a threshold dispersion pattern in which the threshold is periodically changed according to a change in the coordinate in the second direction is registered, and the threshold dispersion pattern is changed according to a resolution in the output image.

16. The image deformation processing method of claim 10, wherein in the dispersion threshold table, a threshold dispersion pattern in which the threshold is periodically changed according to a change in the coordinate in the second direction is registered, and the threshold dispersion pattern is changed according to a print property of a print apparatus for printing the output image.

17. The image deformation processing method of claim 10, wherein a plurality of the dispersion threshold tables are provided, and the dispersion threshold table to be referred when the threshold is obtained, is switched according to an attribute of the specified pixel.

18. The image deformation processing method of claim 17, wherein one of the dispersion threshold tables is the dispersion threshold table in which the threshold is constant regardless of the coordinate in the second direction.

* * * * *